United States Patent
Lee et al.

(10) Patent No.: US 12,250,537 B2
(45) Date of Patent: *Mar. 11, 2025

(54) SECURE MULTIPARTY COMPUTATION FOR INTERNET OF THINGS COMMUNICATIONS

(71) Applicant: QUALCOMM Incorporated, San Diego, CA (US)

(72) Inventors: Soo Bum Lee, San Diego, CA (US); Jay Rodney Walton, Waban, MA (US); John Wallace Nasielski, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/053,699

(22) Filed: Nov. 8, 2022

(65) Prior Publication Data

US 2023/0078345 A1    Mar. 16, 2023

Related U.S. Application Data

(62) Division of application No. 16/866,462, filed on May 4, 2020, now Pat. No. 11,553,335.

(Continued)

(51) Int. Cl.
*H04L 9/08* (2006.01)
*H04L 9/32* (2006.01)
(Continued)

(52) U.S. Cl.
CPC ........... *H04W 12/033* (2021.01); *H04L 9/085* (2013.01); *H04L 9/0861* (2013.01);
(Continued)

(58) Field of Classification Search
CPC . H04W 12/033; H04W 12/041; H04W 12/76; H04L 9/085; H04L 9/0861;
(Continued)

(56) References Cited

U.S. PATENT DOCUMENTS 8,462,955 B2    6/2013   Ureche et al.
9,860,221 B2 *  1/2018   Smith ............... H04L 63/20
(Continued)

OTHER PUBLICATIONS

Boneh D., et al., "A Survey of Two Signature Aggregation Techniques", RSA Laboratories Cryptobytes, vol. 6, No. 2, Aug. 1, 2003 (Aug. 1, 2003), pp. 2-10, XP007908032, 11 Pages, Retrieved from the Internet: URL: http://www.rsa.com/rsalabs/cryptobytes/CryptoBytes_August_2003.pdf, [retrieved on Aug. 11, 2020], the whole document.

(Continued)

*Primary Examiner* — Carl G Colin
*Assistant Examiner* — Andrew Suh
(74) *Attorney, Agent, or Firm* — Holland & Hart LLP

(57) ABSTRACT

Methods, systems, and devices for communications are described. A device or a group of devices may generate data. The group of devices may receive a group profile from a node that identifies the devices to be included, and the group profile may include a function to be evaluated at each of the devices. The node may also provision evaluation parameters which may allow the device to provide authenticated aggregate data to a requesting third party, without sharing the data between the devices, thus concurrently maintaining individual data privacy and data provenance.

20 Claims, 18 Drawing Sheets

Related U.S. Application Data

(60) Provisional application No. 62/844,251, filed on May 7, 2019.

(51) Int. Cl.
*H04L 67/30* (2022.01)
*H04W 12/033* (2021.01)
*H04W 12/041* (2021.01)
*H04W 12/76* (2021.01)

(52) U.S. Cl.
CPC ............ *H04L 9/3242* (2013.01); *H04L 67/30* (2013.01); *H04W 12/041* (2021.01); *H04W 12/76* (2021.01); *H04L 2209/46* (2013.01)

(58) Field of Classification Search
CPC ... H04L 9/3242; H04L 67/30; H04L 2209/46; H04L 67/561; H04L 63/126; H04L 9/3255; H04L 63/0428; H04L 63/0876; H04L 63/123; G06F 21/64
See application file for complete search history.

(56) References Cited

U.S. PATENT DOCUMENTS

| | | | | |
|---|---|---|---|---|
| 10,148,497 | B1* | 12/2018 | Roche | ............... H04L 41/0843 |
| 2012/0320923 | A1* | 12/2012 | Vasseur | ............... H04W 40/22 370/400 |
| 2017/0256173 | A1* | 9/2017 | Burford | ............... G06N 20/00 |
| 2019/0014137 | A1 | 1/2019 | Du et al. | |
| 2019/0044726 | A1* | 2/2019 | Macieira | ............... H04L 67/12 |
| 2019/0044922 | A1 | 2/2019 | Schultz et al. | |
| 2019/0082326 | A1 | 3/2019 | Mathison et al. | |
| 2019/0239071 | A1 | 8/2019 | Krishnan et al. | |
| 2019/0372760 | A1* | 12/2019 | Zheng | ............... H04L 9/085 |
| 2020/0359207 | A1 | 11/2020 | Lee et al. | |
| 2020/0359222 | A1 | 11/2020 | Lee et al. | |
| 2021/0184842 | A1 | 6/2021 | Nix | |

OTHER PUBLICATIONS

International Preliminary Report on Patentability—PCT/US2020/031466, the International Bureau of WIPO—Geneva, Switzerland, Nov. 18, 2021.

International Search Report and Written Opinion—PCT/US2020/031466—ISAEPO—Aug. 21, 2020.

Kumar V., et al., "Secure Data Aggregation in Wireless Sensor Networks", Wireless Sensor Network Technologies for the Information Explosion ERA, [Studies in Computational Intelligence: SCI, ISSN 1860-949X, vol. 278], Springer, DE, pp. 77-107, Jan. 1, 2010 (Jan. 1, 2010), XP008176508, ISBN: 978-3-642-13964-2, p. 78-p. 81, figure 1, p. 84, p. 86-p. 87, p. 89-p. 91, p. 94-p. 100.

Li Z., et al., "Data Aggregation Integrity Based on Homomorphic Primitives in Sensor Networks", Aug. 20, 2010 (Aug. 20, 2010), Annual International Conference on the Theory and Applications of Cryptographic Techniques, EUROCRYPT 2018, [Lecture Notes in Computer Science, LECT. Notes Computer], Springer, Berlin, Heidelberg, pp. 149-162, XP047431187, ISBN: 978-3-642-17318-9 the whole document.

* cited by examiner

SECURE MULTIPARTY COMPUTATION FOR INTERNET OF THINGS COMMUNICATIONS

CROSS REFERENCE

The present application for patent is a Divisional of U.S. patent application Ser. No. 16/866,462 by Lee et al., entitled "SECURE MULITPARTY COMPUTATION FOR INTERNET OF THINGS COMMUNICATIONS," filed May 4, 2020, which claims the benefit of U.S. Provisional Patent Application No. 62/844,251 by Lee et al., entitled "SECURE MULTIPARTY COMPUTATION FOR INTERNET OF THINGS COMMUNICATIONS," filed May 7, 2019, assigned to the assignee hereof, and expressly incorporated by reference herein.

BACKGROUND

The following relates generally to wireless communications, and more specifically to secure multiparty computation for Internet of Things communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Smart devices such as cell phones, tablets, computers, cars, and home appliances are ubiquitous. Each of these devices have the ability to produce data and may connect to the internet to communicate with one another and to transmit the data to other devices and systems. Due to the capability of these devices to create or join a network with each other, the devices may be referred to as Internet of Things devices. In some examples, the data generated at these devices may be confidential data and the receiver of the data may want to verify the authenticity of the data. In some cases, the data may be received directly from a device and the device may authenticate the generated data with a signature. In other cases, the data may be created by multiple devices such as relative location data or an average value. Although current techniques provide for authentication of data from a single device, due to the varying factors of collective generated data, an improved method of collective data authentication may be desired.

SUMMARY

The described techniques relate to improved methods, systems, devices, and apparatuses that support efficient secure multiparty computation. Generally, the described techniques provide for provisioning evaluation parameters for use in verifying the provenance of collectively generated data. In some examples, the provisioned evaluation parameters may be used in evaluating collective data of a device group or user equipment (UE) group without sharing any of the individual data generated at each of the UEs.

In some examples, a device may identify that the device is to provide collective data provenance information for data generated at the device and at other devices, with a first portion of the data being generated at the device and with additional portions of the data being generated at the other devices. The device may receive a group profile, from the node, which identifies the other devices to be included in collective data provenance generation with the device and may transmit the first portion of the data to a node associated with the devices-identified by the group profile. The device may then receive a plurality of evaluation parameters for generating collective data provenance information from the node, where the plurality of evaluation parameters may be at least partially based on the first portion of the data and on the additional portions of the data. A verification parameter of the collective data provenance information may be generated by the device and it may be based at least in part on the first portion of the data, the additional portions of the data, and on the plurality of evaluation parameters. Additionally, a collective verification key may be generated by the device, by combining device-specific verification keys associated with each of the other devices.

A method of communication at a device is described. The method may include identifying that the device is to provide collective data provenance information for data generated at the device and at other devices, with a first portion of the data being generated at the device and with additional portions of the data being generated at the other devices, receiving a group profile, from the node, which identifies the other devices to be included in collective data provenance generation with the device, and transmitting the first portion of the data to a node associated with the devices identified by the group profile. The method may further include receiving, from the node, a set of evaluation parameters for generating collective data provenance information, the set of evaluation parameters being based on the first portion of the data and on the additional portions of the data, generating a verification parameter of the collective data provenance information based on the first portion of the data, the additional portions of the data, and on the set of evaluation parameters, and generating a collective verification key by combining device-specific verification keys associated with each of the other devices.

An apparatus for communication at a device is described. The apparatus may include a processor, memory in electronic communication with the processor, and instructions stored in the memory. The instructions may be executable by the processor to cause the apparatus to identify that the device is to provide collective data provenance information for data generated at the device and at other devices, with a first portion of the data being generated at the device and with additional portions of the data being generated at the other devices, receive a group profile, from the node, which identifies the other devices to be included in collective data provenance generation with the device, and transmit the first portion of the data to a node associated with the devices identified by the group profile. The instructions may be further executable by the processor to cause the apparatus to receive, from the node, a set of evaluation parameters for generating collective data provenance information, the set of evaluation parameters being based on the first portion of the data and on the additional portions of the data, generate a verification parameter of the collective data provenance information based on the first portion of the data, the additional portions of the data, and on the set of evaluation parameters, and generate a collective verification key by combining device-specific verification keys associated with each of the other devices.

Another apparatus for communication at a device is described. The apparatus may include means for identifying that the device is to provide collective data provenance information for data generated at the device and at other devices, with a first portion of the data being generated at the device and with additional portions of the data being generated at the other devices, receiving a group profile, from the node, which identifies the other devices to be included in collective data provenance generation with the device, and transmitting the first portion of the data to a node associated with the devices identified by the group profile. The apparatus may further include means for receiving, from the node, a set of evaluation parameters for generating collective data provenance information, the set of evaluation parameters being based on the first portion of the data and on the additional portions of the data, generating a verification parameter of the collective data provenance information based on the first portion of the data, the additional portions of the data, and on the set of evaluation parameters, and generating a collective verification key by combining device-specific verification keys associated with each of the other devices.

A non-transitory computer-readable medium storing code for communication at a device is described. The code may include instructions executable by a processor to identify that the device is to provide collective data provenance information for data generated at the device and at other devices, with a first portion of the data being generated at the device and with additional portions of the data being generated at the other devices, receive a group profile, from the node, which identifies the other devices to be included in collective data provenance generation with the device, and transmit the first portion of the data to a node associated with the devices identified by the group profile. The code may further include instructions executable by a processor to receive, from the node, a set of evaluation parameters for generating collective data provenance information, the set of evaluation parameters being based on the first portion of the data and on the additional portions of the data, generate a verification parameter of the collective data provenance information based on the first portion of the data, the additional portions of the data, and on the set of evaluation parameters, and generate a collective verification key by combining device-specific verification keys associated with each of the other devices.

In some examples of the method, apparatuses, and non-transitory computer-readable medium described herein, identifying that the device may be to provide collective data provenance information may include operations, features, means, or instructions for receiving, from the node, an indication to provide the collective data provenance information.

In some examples of the method, apparatuses, and non-transitory computer-readable medium described herein, identifying that the device may be to provide collective data provenance information may include operations, features, means, or instructions for identifying that a predetermined event may have occurred, where the predetermined event triggers the collective data provenance generation.

In some examples of the method, apparatuses, and non-transitory computer-readable medium described herein, receiving the group profile further may include operations, features, means, or instructions for receiving, with the group profile, a function for generating device-specific portions of the collective data provenance information.

Some examples of the method, apparatuses, and non-transitory computer-readable medium described herein may further include operations, features, means, or instructions for locally evaluating the function at the device to generate a local evaluation result, based on the first portion of the data.

Some examples of the method, apparatuses, and non-transitory computer-readable medium described herein may further include operations, features, means, or instructions for sharing the local evaluation result and a corresponding intermediate verification parameter between the devices, and receiving the respective local evaluation results from the other devices.

Some examples of the method, apparatuses, and non-transitory computer-readable medium described herein may further include operations, features, means, or instructions for generating a collective evaluation result, based on the local evaluation result.

Some examples of the method, apparatuses, and non-transitory computer-readable medium described herein may further include operations, features, means, or instructions for sharing individual verification keys corresponding to each of the individual devices, between each of the devices, based on receiving, the set of evaluation parameters.

Some examples of the method, apparatuses, and non-transitory computer-readable medium described herein may further include operations, features, means, or instructions for generating the collective verification key using the shared individual verification keys.

Some examples of the method, apparatuses, and non-transitory computer-readable medium described herein may further include operations, features, means, or instructions for verifying the collective evaluation result using the collective verification key and the verification parameter.

In some examples of the method, apparatuses, and non-transitory computer-readable medium described herein, generating the collective verification key further may include operations, features, means, or instructions for employing a multiparty computation scheme using device-specific portions associated with each of the devices and the set of evaluation parameters.

In some examples of the method, apparatuses, and non-transitory computer-readable medium described herein, employing the multiparty computation scheme further may include operations, features, means, or instructions for evaluating a function in an online phase of the multiparty computation scheme and using the set of evaluation parameters received in a provisioning phase of the multiparty computation scheme.

Some examples of the method, apparatuses, and non-transitory computer-readable medium described herein may further include operations, features, means, or instructions for verifying an authenticity of the data collectively generated through evaluation of a message authentication code received for each of the other devices.

Some examples of the method, apparatuses, and non-transitory computer-readable medium described herein may further include operations, features, means, or instructions for sharing the collective data provenance information between each of the devices, based on verifying the provenance of the collective data provenance information.

Some examples of the method, apparatuses, and non-transitory computer-readable medium described herein may further include operations, features, means, or instructions for signing the data using the collective data provenance information.

Some examples of the method, apparatuses, and non-transitory computer-readable medium described herein may further include operations, features, means, or instructions for transmitting the data signed with the collective data provenance information to a server.

In some examples of the method, apparatuses, and non-transitory computer-readable medium described herein, receiving the group profile further may include operations, features, means, or instructions for identifying group profile parameters used for generating collective data at the devices, and determining, based on the identified group profile parameters, how the device and the other devices may be to generate collective data provenance information.

In some examples of the method, apparatuses, and non-transitory computer-readable medium described herein, receiving the set of evaluation parameters further may include operations, features, means, or instructions for receiving, at each of the devices, at least one of a message authentication code (MAC) share, a MAC key share, a shared random parameter, or a multiplicative triple.

A method of communication at a node is described. The method may include identifying a device group for collectively providing data provenance information for data generated at the device group to a third party, provisioning a group profile, from the node, to the device group, receiving, at the node, data from the device group, with individual portions of the data being generated at individual devices, and provisioning, to the device group, a set of evaluation parameters for generating collective data provenance information, the set of evaluation parameters being based on the data from the device group.

An apparatus for communication at a node is described. The apparatus may include a processor, memory in electronic communication with the processor, and instructions stored in the memory. The instructions may be executable by the processor to cause the apparatus to identify a device group for collectively providing data provenance information for data generated at the device group to a third party, provision a group profile, from the node, to the device group, receive, at the node, data from the device group, with individual portions of the data being generated at individual devices, and provision, to the device group, a set of evaluation parameters for generating collective data provenance information, the set of evaluation parameters being based on the data from the device group.

Another apparatus for communication at a node is described. The apparatus may include means for identifying a device group for collectively providing data provenance information for data generated at the device group to a third party, provisioning a group profile, from the node, to the device group, receiving, at the node, data from the device group, with individual portions of the data being generated at individual devices, and provisioning, to the device group, a set of evaluation parameters for generating collective data provenance information, the set of evaluation parameters being based on the data from the device group.

A non-transitory computer-readable medium storing code for communication at a node is described. The code may include instructions executable by a processor to identify a device group for collectively providing data provenance information for data generated at the device group to a third party, provision a group profile, from the node, to the device group, receive, at the node, data from the device group, with individual portions of the data being generated at individual devices, and provision, to the device group, a set of evaluation parameters for generating collective data provenance information, the set of evaluation parameters being based on the data from the device group.

In some examples of the method, apparatuses, and non-transitory computer-readable medium described herein, provisioning the group profile further may include operations, features, means, or instructions for provisioning, to the device group, at least one of a group identity, a device index, a member list, group credentials, or a function for generating the collective data provenance information of the data generated at the device group.

In some examples of the method, apparatuses, and non-transitory computer-readable medium described herein, provisioning the set of evaluation parameters further may include operations, features, means, or instructions for provisioning, to the device group, at least one of a MAC share, a MAC key share, a shared random parameter, or a multiplicative triple.

Some examples of the method, apparatuses, and non-transitory computer-readable medium described herein may further include operations, features, means, or instructions for verifying an authenticity of the data collectively generated through evaluation of a message authentication code received for each of the other devices, using a group public key.

Some examples of the method, apparatuses, and non-transitory computer-readable medium described herein may further include operations, features, means, or instructions for generating at least one of a MAC key and a MAC key share for provisioning to the device group.

Some examples of the method, apparatuses, and non-transitory computer-readable medium described herein may further include operations, features, means, or instructions for generating a MAC on data based on the data received from the device group.

Some examples of the method, apparatuses, and non-transitory computer-readable medium described herein may further include operations, features, means, or instructions for generating a MAC share based on creating the MAC on data for provisioning to the device group.

Some examples of the method, apparatuses, and non-transitory computer-readable medium described herein may further include operations, features, means, or instructions for generating at least one of a shared random parameter or a multiplicative triple for provisioning to the device group.

DETAILED DESCRIPTION

Generally, the described techniques provide for efficient secure multiparty computation based on using provisioned evaluation parameters to verify the provenance or authenticity of the individually produced data used to generate the collective data. When providing collective data generated by a device group, individual data privacy may be desired, and a number of issues may arise. In some examples, the devices may be mutually distrusting or may not have the ability to establish trust between one another. Additionally, introducing a privacy requirement of not disclosing the raw data generated at each of the devices, such that each device may not know the raw data contributed by each of the other devices, increases the complexity of authenticating raw data. Although trust or verification may be established between each of the devices, current methods may be computationally expensive and may not be scalable with the growing number of Internet of Things (IoT) devices.

Provisioning or transmitting evaluation parameters, from an owner to the individual devices, to verify authentication of individually generated data, may be beneficial for secure multiparty computations. In some examples, provenance or authentication may be guaranteed at the originating device or device producing the data. Fully homomorphic encryption may be employed for securely tying together different services without sharing sensitive data, but as with other authentication methods, may be computationally expensive by introducing unwanted latency into processing time.

Figure 1:
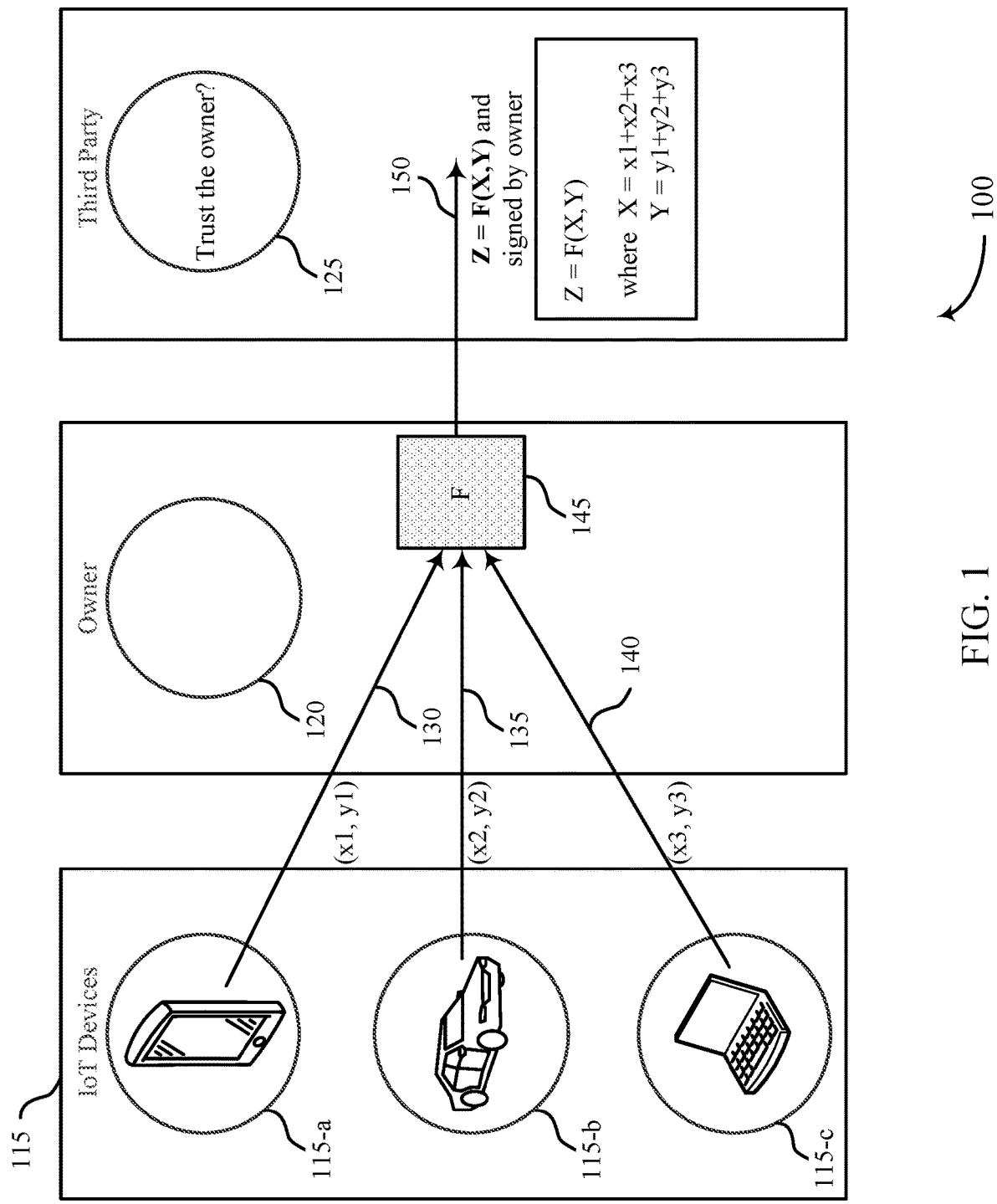
FIG. 1 illustrates an example of a system that supports secure multiparty computation for Internet of Things communications in accordance with aspects of the present disclosure.

FIG. 1 illustrates an example of a communication system 100 that supports secure multiparty computation for Internet of Things communications in accordance with aspects of the present disclosure. In some examples, communication system 100 may implement aspects of communication system 800. In the example of FIG. 1, the communication system 100 may include device 115-$a$, device 115-$b$, device 115-$c$ of device group 115. In some examples, one or more of the devices of the device group may be an example of a user equipment (UE) 815 of FIG. 8, and may be any appropriate wired or wireless communications device.

In FIG. 1, device group 115 may be a group of Internet of Things devices that may produce data. The devices of device group 115 may be any Internet of Things devices, but for explanatory and discussion purposes and not of limitation, device 115-$a$ may be a cell phone, device 115-$b$ may be a car, and device 115-$c$ may be a laptop computer. The devices may be any wired or wireless device that may produce data and that may be capable of communicating the produced data to a node, which in some examples, may be an owner of the data. The data produced by device group 115 may be provided to a third party 125, via node 120, as collective data, such as an average or relative value. Device 115-$a$ may produce data $x_1$, $y_1$, device 115-$b$ may produce data $x_2$, $y_2$, device 115-$c$ may produce data $x_3$, $y_3$, and device 115-$n$ (not illustrated in FIG. 1) may produce data $x_n$, $y_n$.

In the example of FIG. 1, device group 115 and corresponding data produced by device group 115 may belong to a node 120 and device group 115 may transmit the individually generated data to node 120. In some examples, device 115-$a$ may transmit the individually generated data $x_1$, $y_1$ via communications link 130, device 115-$b$ may transmit the individually generated data $x_2$, $y_2$ via communications link 135, and device 115-$c$ may transmit the individually generated data $x_3$, $y_3$ via communications link 140, and so forth. The communications links 130, 135, and 140 may be wired or wireless communications links. The node 120 may perform function 145 on the received data from device group 115. Function 145 may be any appropriate mathematic function such as an arithmetic function, an algebraic function, and so forth. Function 145 may produce output value Z, which may be a function of X and Y, such that Z=F(X,Y). In the example of FIG. 1, X may be the sum of each $x_n$ produced at each individual device, such that $X=x_1+x_2+x_3+ \ldots x_n$ for n devices. Further, Y may be the sum of each $y_n$ produced at each individual device, such that $Y=y_1+y_2+y_3+ \ldots y_n$ for n devices.

In FIG. 1, node 120 may sign the output value Z in an attempt to authenticate the data provided to third party 125. Even so, a number of trust issues may arise with multiple devices generating data that is provided as collective data to third party 125. Third party 125 may not trust node 120 and may not be able to authenticate the collective data provided by node 120. Further, third party 125 may not trust the individually generated data by each of the devices 115-$a$, 115-$b$, and 115-$c$. In some examples, the individually generated data may guarantee the provenance at the individual devices and throughout processing by other parties, which may be referred to as fully homomorphic encryption (FHE) herein. However, FHE may be computationally expensive and may introduce unwanted latency and processing overhead into the network. In some examples, the individual devices may process data cooperatively with one another and may sign the processed result or collective data, which may be referred to as secure multiparty computation (MPC) herein. By using secure MPC and signing the computation result or collective data, data provenance may be established, but secure MPC may also involve unwanted messaging overhead. In some examples, multiple rounds of public key crypto operations and message exchanges may be required to hide the individually owned data and the computational complexity may increase as the number of operations to evaluate the function increase, which may be an undesirable result. In some examples node 120 may be a party that owns the devices that produce or generate the data and the node 120 may be referred to interchangeably as the owner.

In some examples of secure MPC, a function may be performed at each of the devices. As discussed, the output value Z that is output by node 120 after performing function 145 may also be the sum of individual output value z's evaluated at each of the individual devices. In some examples, $Z=z_1+z_2+z_3+ \ldots z_n$, for n devices. Z may additionally be set forth as, $Z=F(x_1, y_1)+F(x_2, y_2)+F(x_3, y_3)+ \ldots F(x_n, y_n)$, which may be $F(x_1+x_2+x_3+ \ldots x_n, y_1+y_2+y_3+ \ldots y_n)$, thus yielding, $F(X,Y)$. Thus, each device may locally evaluate $z_i=F(x_i, y_i)$ and all devices may open or share the result $z_i$ with each other or between each of the devices that generated individual data. Each device may authenticate or verify the $z_i$ of each of the other devices without knowing the individually generated data $x_i$, $y_i$ for each device. Continuing this example, all of the devices may agree on Z and sign the data. Although the function discussed is additive, the function may be any appropriate function that may be performed by the devices. In some examples, the devices may be devices that may communicate via a wired or wireless connection, and in some cases may be a wireless device such as a UE.

Figure 2:
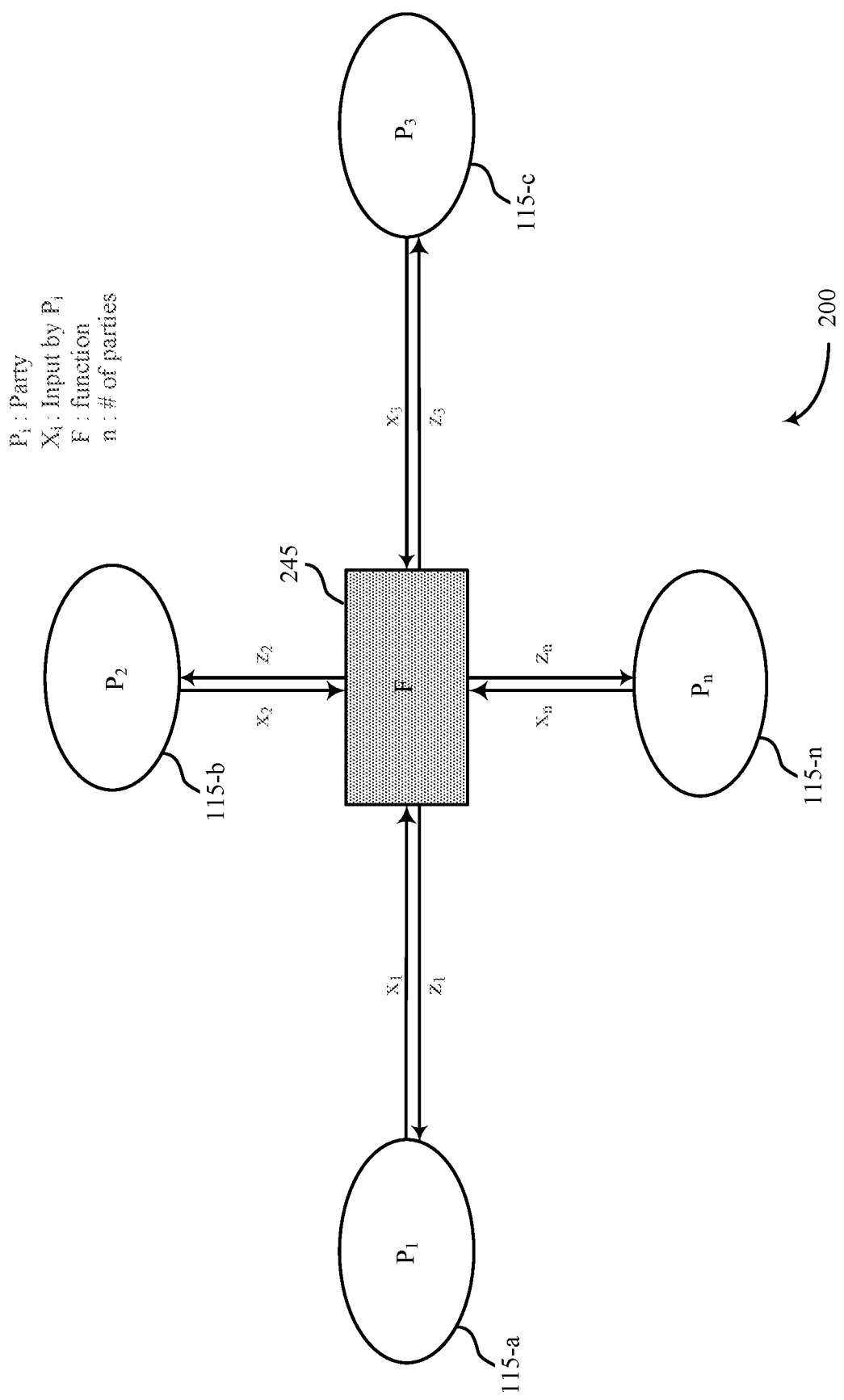
FIG. 2 illustrates an example of a system that supports secure multiparty computation for Internet of Things communications in accordance with aspects of the present disclosure.

FIG. 2 illustrates an example of a communication system 200 that supports efficient secure multiparty computation for Internet of Things communications in accordance with aspects of the present disclosure. In some examples, communication system 200 may implement aspects of communication system 100 and 800. In the example of FIG. 2, the communication system 200 may include party 1 ($P_1$) which may be an example of device 115-*a*, party 2 ($P_2$) which may be an example of device 115-*b*, and party 3 ($P_3$) which may be an example of device 115-*c*, which may be any appropriate wired or wireless communications device and in some cases may be an example of UEs 815 as discussed in FIG. 8 herein.

Similar to FIG. 1, FIG. 2 is an example of MPC, in which each party, generically referred to as $P_i$, may provide private input data $x_i$ to function 245, in which data $x_i$ may be a generic reference to data $x_1$ which may be generated at $P_1$, data $x_2$ which may be generated at $P_2$, data $x_3$ which may be generated at $P_3$, and so forth. Data $x_i$ may be private input when individual data privacy is desired, as data $x_i$ may not be opened or shared with the other devices that generate data. Function 245 may evaluate the private input data $x_i$ to generate output $z_i$. Generally, F may be a function of $x_1, x_2, x_3, \ldots, x_n$) and may output $z_1, z_2, z_3, z_n$, respectively. When evaluating function 245 in this manner, each party $P_i$ or a third party may receive output $z_i$ without any private input data being revealed between each of the parties that produce data.

In some examples of FIG. 2, data privacy may be maintained without the data-generating parties having to share or reveal data to another device and/or to the third party that may be requesting the collective data. In FIG. 2, evaluating function 245 may be sufficient in the example that a trusted party evaluates function 245. However, in the example that a trusted party may not be assumed, the role of the trusted party may be replaced by a protocol between the parties that generate data, own the data, and request the data, which will be discussed in further detail herein.

Figure 3:
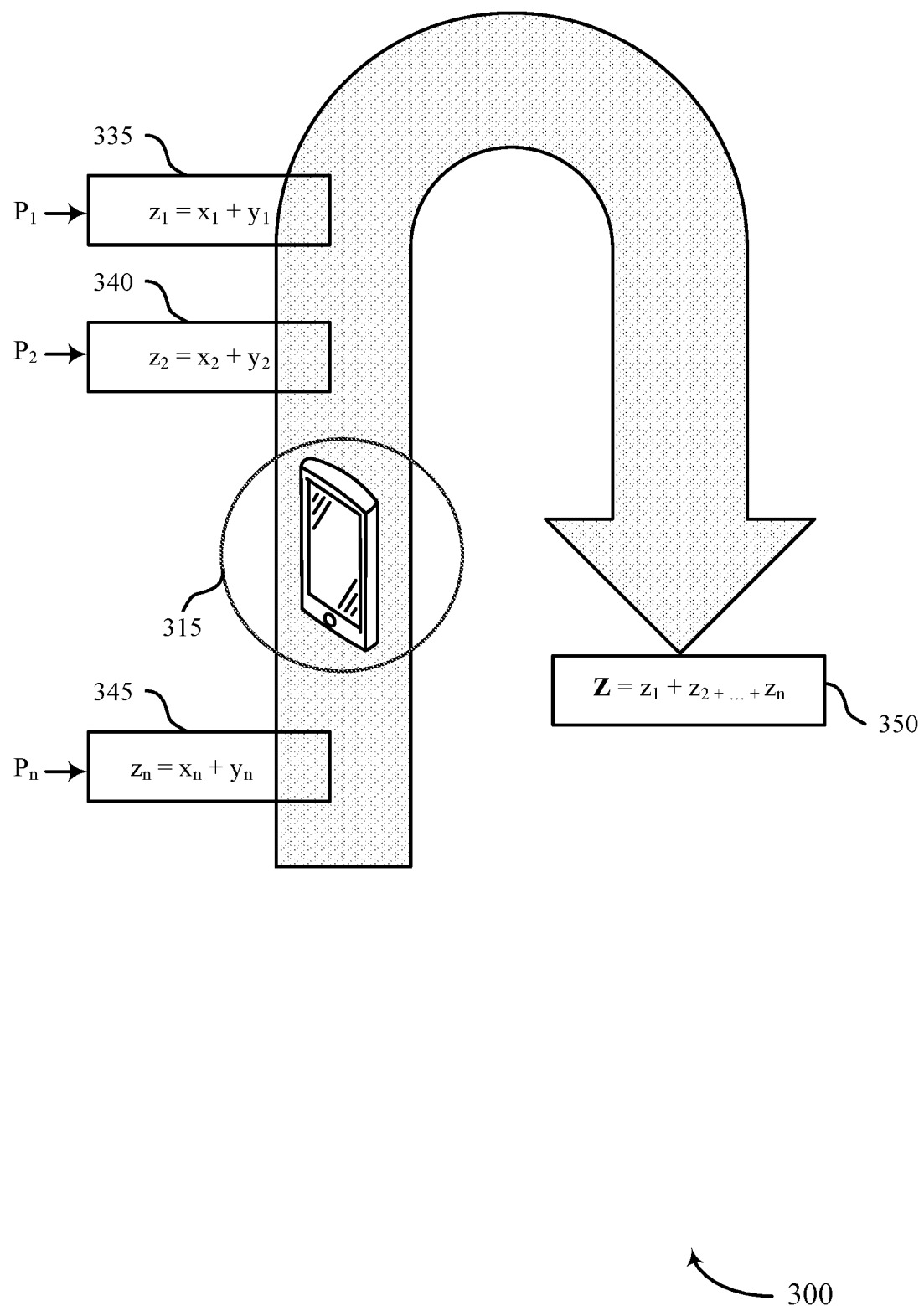
FIG. 3 illustrates an example of a system that supports secure multiparty computation for Internet of Things communications in accordance with aspects of the present disclosure.

FIG. 3 illustrates an example of a communication system 300 that supports efficient secure multiparty computation for Internet of Things communications in accordance with aspects of the present disclosure. In some examples, communication system 300 may implement aspects of communication system 100, 200, and 800. In the example of FIG. 3, the communication system 300 may include party 1 ($P_1$) which may be an example of device 115-*a*, party 2 ($P_2$) which may be an example of device 115-*b*, and party 3 ($P_3$) which may be an example of device 115-*c*, which may be an example of devices 115 as discussed in FIG. 1, FIG. 2, and UEs 815 of FIG. 8.

Similar to FIG. 2, FIG. 3 is an example of secure MPC, in which each of the parties or devices 315 may generate individual data or individual portions of data. In some examples, party 1 or $P_1$ may generate individual data $x_1$ and $y_1$, party 2 or $P_2$ may generate individual data $x_2$ and $y_2$, party n or $P_n$ may generate individual data $x_n$ and $y_n$, and so forth. In FIG. 3, party 1 may generate the individual data $x_1$ and $y_1$ and may calculate $z_1$ using the function 335. Similarly, party 2 may generate the individual data $x_2$ and $y_2$ and may calculate $z_2$ using the function 340, and party n may generate the individual data $x_n$ and $y_n$ and may calculate $z_n$ using the function 345. Although the functions 335, 340, and 345 are additive, it is for explanatory purposes only and not of limitation. Functions 335, 340, and 345 may be additive, algebraic, or any other appropriate function or combination of functions. Each of the individual parties may evaluate or calculate the individual $z_n$ values and the individual parties may not share the individually generated data with other parties that also generated data. The individual parties of FIG. 3 may also be referred to herein as devices. The individual parties and/or devices may both generate and/or produce data.

In some examples, the individually calculated $z_n$ values may be provided to the node for further data evaluation. In FIG. 3, the parties may provide the individual $z_1, z_2, \ldots, z_n$ values to the node. The node may calculate Z using the function 350 and also using the individual $z_n$ values. In some examples, the function 350 for calculating Z may equal the sum of the individual $z_n$ values, $Z=z_1+z_2+ \ldots +z_n$.

Figure 4:
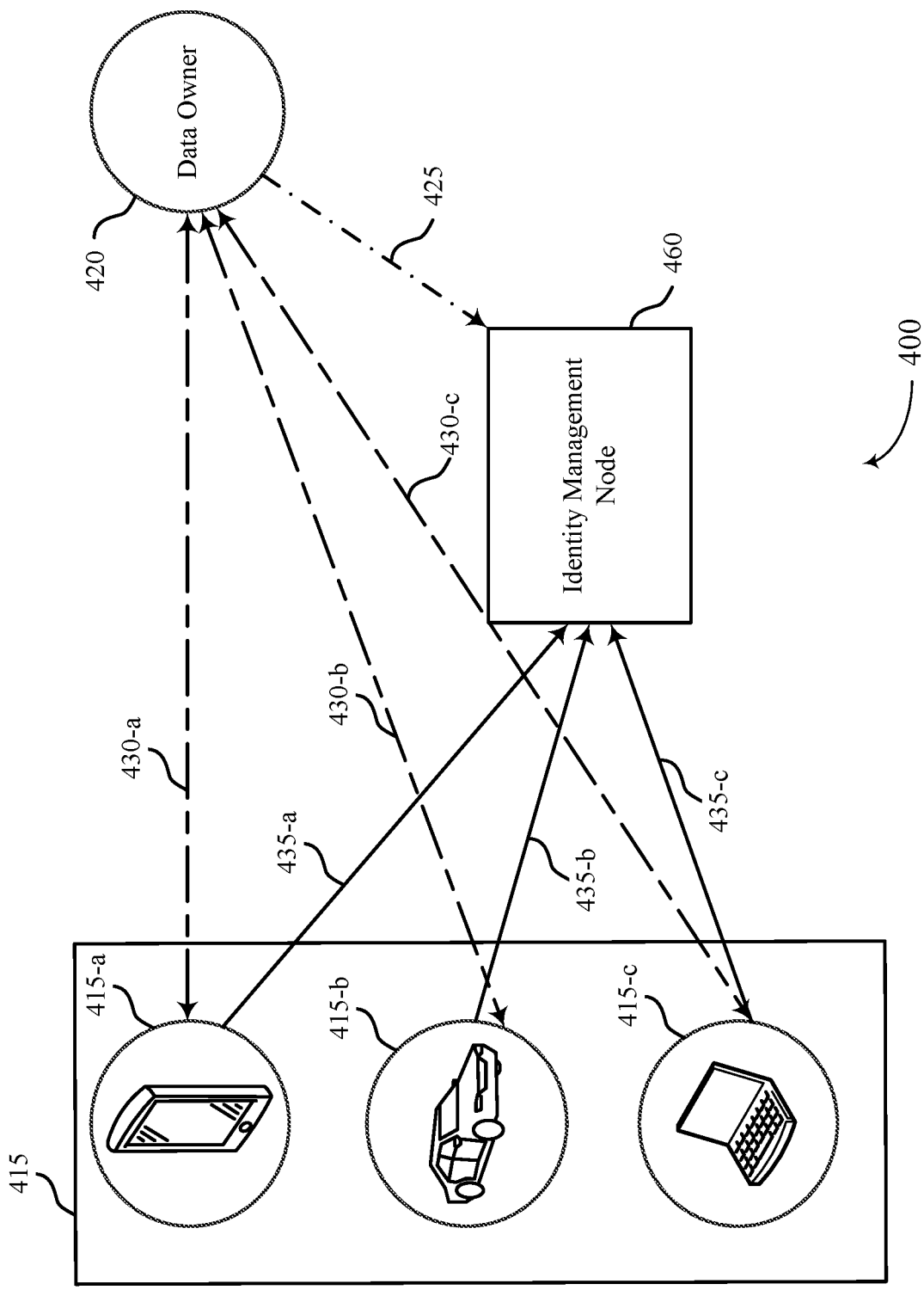
FIG. 4 illustrates an example of a system that supports secure multiparty computation for Internet of Things communications in accordance with aspects of the present disclosure.

FIG. 4 illustrates an example of a communication system 400 that supports efficient secure multiparty computation for Internet of Things communications in accordance with aspects of the present disclosure. In some examples, communication system 400 may implement aspects of communication system 100, 200, 300, and 800, which in some examples may be a wireless communication system. In the example of FIG. 4, the communication system 400 may include device 415-*a*, device 415-*b*, and device 415-*c* of device group 415, which may be an example of devices 115 as discussed in FIG. 1 and FIG. 2, or devices 315 of FIG. 3. The devices as described herein may be wired or wireless devices, and in some cases the wireless devices may be a UE 815 as described in FIG. 8.

As previously discussed, devices of a device group may produce data, where the individual data, when aggregated, may provide value. In some examples, the device which generates the data may be trusted and the devices may trust one another, and individual data privacy may not be necessary. In this example, if one of these devices that generates data is compromised, then the aggregate data is also compromised, and it may be desirable to avoid this type of single point failure. Further to this example and based on the mutual trust assumption, it may be possible to verify the data contributed by the individual devices through some type of authentication, without knowing the role of the devices.

Alternatively and in some cases, the owner of the individual data may not want to disclose the individually produced data to any external parties that may wish to use the data, but may provide the aggregate data while still protecting the individual data privacy. Further considerations may be present, in that each device that may produce and/or generate data may also be mutually distrusting of one another. Data provenance may be desirable due to the quality of data requests of the third party using the data. In some examples, a processing function, F(X,Y) may be applied to data collected over all the devices, where X may include the individual data xi produced by each device and Y may include the individual data $y_i$ produced by each device.

A third party (such as a third party buyer) may request the aggregate data and may additionally request authenticated aggregate data. The aggregate data may be referred to herein as Z, where Z does not include the values of the individual data such as $x_i$, $y_i$. The owner or the node may collectively sign the data Z. However, an issue may arise when the data is provided by the individual devices, but the signature is generated by the node. Without a solution, the chain of provenance of the data may be lost. Therefore, it may be desirable to improve on providing data provenance while protecting the individual data privacy.

In FIG. 4, an ownership structure may be created between the node 420 and the device group 415 which may provide for a more efficient, secure MPC, by reducing processing intensive computations and which may additionally allow the devices to protect and/or not disclose individually owned raw data generated at each device. In FIG. 4, the node 420 may be a device owner and/or a data owner. As illustrated in FIG. 4, the ownership structure may be created between the node 420, the device group 415 and the identity management node 460. Generally, the node 420 may be a device owner and in some cases may be a data owner of the data generated by the device group 415. The identity management node 460 may store credentials, store ownership structures and may provide verification services when appropriate.

As illustrated in FIG. 4, user registration may occur via communications link 425, from the node 420 and to the identity management node 460 by registering the node 420 as a user with the identity management node 460. During the device personalization process, the node 420 may create device personalization via communications links 430-*a*, 430-*b*, and 430-*c*, for respective devices 415-*a*, 415-*b*, and 415-*c*. In some cases, the communications links 430-*a*, 430-*b*, and 430-*c* may be unidirectional communications from the node 420 to the device group 415, unidirectional communications from the device group 415 to the node 420, or bidirectional communications between the node 420 and the device group 415.

In FIG. 4, device 415-*a*, may share, transmit, or communicate, via communications link 430-*a*, the device identification and device credentials of device 415-*a* to the node 420. Device 415-*b*, may share, transmit, or communicate, via communications link 430-*b*, the device identification and device credentials of device 415-*b* to the node 420, and similarly device 415-*c*, may share, transmit, or communicate, via communications link 430-*c*, the device identification and device credentials of device 415-*c* to the node 420. Node 420 may provision or share the owner profile or information with devices 415-*a*, 415-*b*, and 415-*c* via respective communications links 430-*a*, 430-*b*, and 430-*c*.

Additionally during the device personalization process, the node 420 may provision a group profile via the communications links 430 to the device group 415. The group profile may include various information including, but not limited to, a group identification, device index, member list, credential(s), functions to evaluate at each of the individual devices, and so forth, and any combination thereof. The group profile may identify other devices to be included in collective data provenance generation with the existing devices and may additionally provide a function for generating device-specific portions of the collective data provenance information. After each device locally receives the function via the group profile, devices 415-*a*, 415-*b*, and 415-*c* may each locally evaluate the received function. Further, each device may perform the same evaluation of the function until the evaluation of the function is complete, to produce a local evaluation result at each of the devices.

In the group profile, the group identity may identify the group, and may identify that the device or devices may provide collective data provenance information for data generated at the device or devices. The device index may identify a specific device where a device identification may also be used. A member list may include group member indices or identifiers and the credentials may be group member credentials (e.g., public keys). In some examples, the communications links 430 may be a secure channel which may be created based on the device personalization. Further, group registration may be additionally illustrated in FIG. 4 via communications links 435-*a*, 435-*b*, and 435-*c*. Devices 415-*a*, 415-*b*, and 415-*c* may register as a group via respective communications links 435-*a*, 435-*b*, and 435-*c*.

Figure 5:
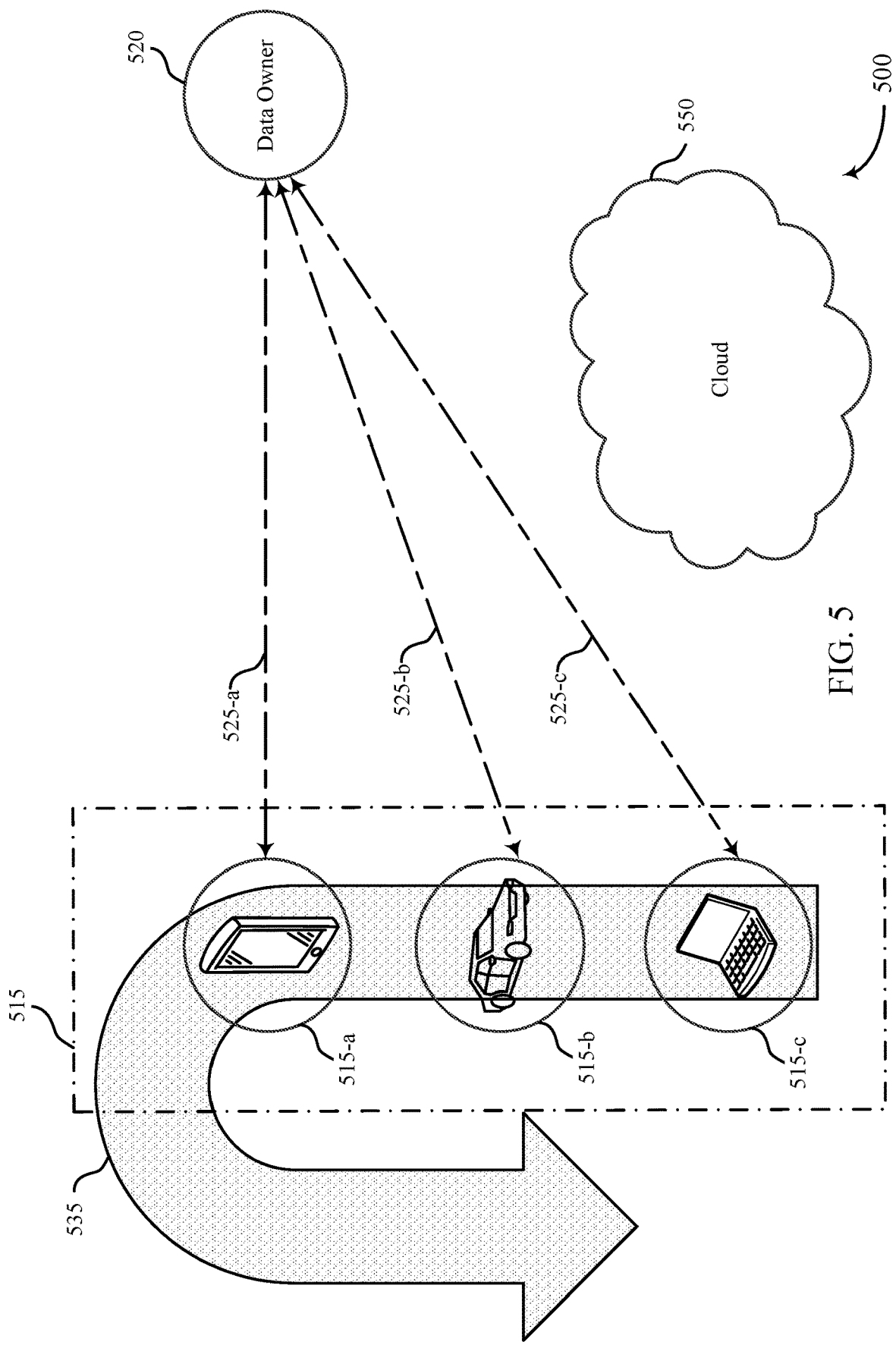
FIG. 5 illustrates an example of a system that supports secure multiparty computation for internet of things communications in accordance with aspects of the present disclosure.

FIG. 5 illustrates an example of a system 500 that supports efficient secure multiparty computation for Internet of Things communications in accordance with aspects of the present disclosure. In some examples, communication system 500 may implement aspects of communication system 100, 200, 300, 400, and 800, which in some examples may be a wireless communication system. In the example of FIG. 5, the communication system 500 may include device 515-*a*, device 515-*b*, and device 515-*c* of device group 515, which may be an example of devices 115, 315, or 415, as discussed in FIG. 1, FIG. 2, FIG. 3, and FIG. 4. The devices as described herein may be wired or wireless devices, and in some cases the wireless devices may be a UE 815 as described in FIG. 8.

In FIG. 5, each of the devices 515-*a*, 515-*b*, 515-*c* may produce or generate data. In some examples, device 515-*a* may individually produce or generate individual data ($x_1$, $y_1$), device 515-*b*, may individually produce or generate individual data ($x_2$, $y_2$), and device 515-*c* may individually produce or generate individual data ($x_3$, $y_3$). In some examples, the data produced by device 515-*a* may be referred to as a first portion of the data and the data produced by the other devices 515-*b*, 515-*c*, . . . , 515-*n* may be referred to as the additional portions of the data. To perform secure MPC, the devices may not share the individually produced data between each of the devices, but may instead share all of the individual generated data with the node 520. In some examples, the node 520 may be a device owner and/or a data owner. As illustrated in FIG. 5, device 515-*a* may share the individual data ($x_1$, $y_1$) via the communications link 525-a, with the node 520. Device 515-b may share the individual data ($x_2$, $y_2$) via the communications link 525-b, and similarly device 515-c may share the individual data ($x_3$, $y_3$) via the communications link 525-c.

After the node 520 receives the individually produced data (e.g., ($x_n$, $y_n$)) from each of the respective devices of device group 515, the node 520 may generate evaluation parameters such as a message authentication code (MAC) key and MAC key share. The MAC key, which may be referred to as the collective verification key, may be represented by alpha or $\alpha$, and the MAC key share may be referred to as the individual verification key and may be represented by alpha$_i$ or $\alpha_i$. The MAC key, $\alpha$, may be generated by combining all the received MAC key shares $\alpha_i$'s from each of the other individual devices.

The node 520 may generate or create a MAC on data based on the individual data received from the individual devices 515-a, 515-b, 515-c. The MAC on data may be represented by $\gamma(x)$, $\gamma(y)$. The node 520 may additionally generate or create MAC shares, $\gamma(x)_i$, $\gamma(y)_i$ to be provisioned to each of the individual devices. The node 520 may then provision the MAC key shares, $\alpha_i$, and the MAC shares, $\gamma(x)_i$, $\gamma(y)_i$, to each of the individual devices. In some examples, the node may provision MAC key share $\alpha_1$ and $\gamma(x)_1$, $\gamma(y)_1$ to device 515-a, MAC key share $\alpha_2$ and MAC shares, $\gamma(x)_2$, $\gamma(y)_2$ to device 515-b, and MAC key share $\alpha_3$ and MAC shares $\gamma(x)_3$, $\gamma(y)_3$ to device 515-c. In some examples, the node 520 may provision the MAC key shares and the MAC shares when the function 535 is additive. In the example, the function 535 is additive, the final MAC may be the addition of all intermediate MAC values, which will be discussed in further detail herein.

As previously discussed in FIG. 4, function 535 may be locally evaluated at each of the devices 515-a, 515-b, and 515-c. Each device may locally receive the function 535 via the group profile, and each of the devices 515-a, 515-b, 515-c may each locally evaluate the received function. While the device group continues to evaluate the function locally at each of the devices, the devices may share evaluation parameters (e.g., MAC share) between each of the devices at each step of computing the function, thus obtaining an intermediate local evaluation result and intermediate verification parameter for sharing between each of the devices, which will be discussed in detail herein. Further, each device may perform the same evaluation of the function until the evaluation of the function 535 is complete, to produce a local evaluation result at each of the devices. After the evaluation of the function 535 is completed, the devices 515-a, 515-b, 515-c may share the local evaluation results and verification parameters (e.g., MAC share) with each of the other devices.

In some examples, the function 535 may be multiplicative. In this example, the multiplicative triple may be shared amongst the devices to assist in evaluation of the multiplicative function. The multiplicative function 535 may include subfunctions $f_1, f_2, \ldots, f_n$. To evaluate $f_i$, the devices 515 may share the evaluation parameters (e.g., for multiplication) and after evaluation of the intermediate value may be shared between the devices 515. The multiplicative function will be discussed in further detail herein.

The device 515-a, as well as the devices 515-b and 515-c, may each receive the local evaluation results and the verification parameters (e.g., MAC share) from each of the other data generating devices. In some examples, device 515-a may construct a result Z (e.g., may generate a collective evaluation result which may be based on the local evaluation result at least in part) and verification parameter, which may be referred to herein as MAC of Z or represented by $\gamma(Z)$. The device 515-a may then transmit or share its portion of the verification key (e.g., MAC key share, $\alpha_i$) provisioned by the node 520. The device 515-a as well as the other devices 515-b and 515-c may all receive the other portions of the verification key from each of the other devices. The devices may then verify the result Z, using the MAC key (e.g., $\alpha$) and the verification parameter (e.g., MAC of Z or $\gamma(Z)$). The verification may be performed by validating $\gamma(Z)=\alpha*Z$. Once Z has been verified, the collective data provenance information may be shared between each of the devices. In some examples, the authenticity of the data collectively generated through evaluation of MAC of Z, where MAC of Z may be received for each of the devices, may be verified.

In some examples, the devices 515-a, 515-b, and 515-c may sign the data to guarantee and/or authenticate the provenance of the data. Although the data may be signed by each individual device and reported to the cloud 550 and/or data storage separately, this may involve high latency messaging and verification overhead which may be computationally expensive. Alternatively in some examples, the device group 515 may collectively sign the data which may employ a multi-signature and/or threshold-signature scheme which may be more efficient than individual signatures. In some examples, the data may be signed using the collective data provenance information. After evaluation of the function completes and the devices collectively agree on an output, the devices may collectively create a signature and collectively sign the data. The devices may then report the results to the cloud 550 and/or to a server.

In some examples, device 515-a of device group 515 may be triggered to evaluate the function 535 with other devices of the device group 515. The device 515-a may identify that the device 515-a may provide collective data provenance information. Further, the device may be signaled by the node 520, by receiving an indication from the node 520 to provide the collective data provenance information. In some examples, the trigger to evaluate the function 535 with other devices of the device group 515 may be an event and/or may be timed. For example, device 515-a may identify that the device 515-a may provide collective data provenance information and the device 515-a may identify that a predetermined event has occurred, where the predetermined event may trigger the collective data provenance generation.

Figure 6:
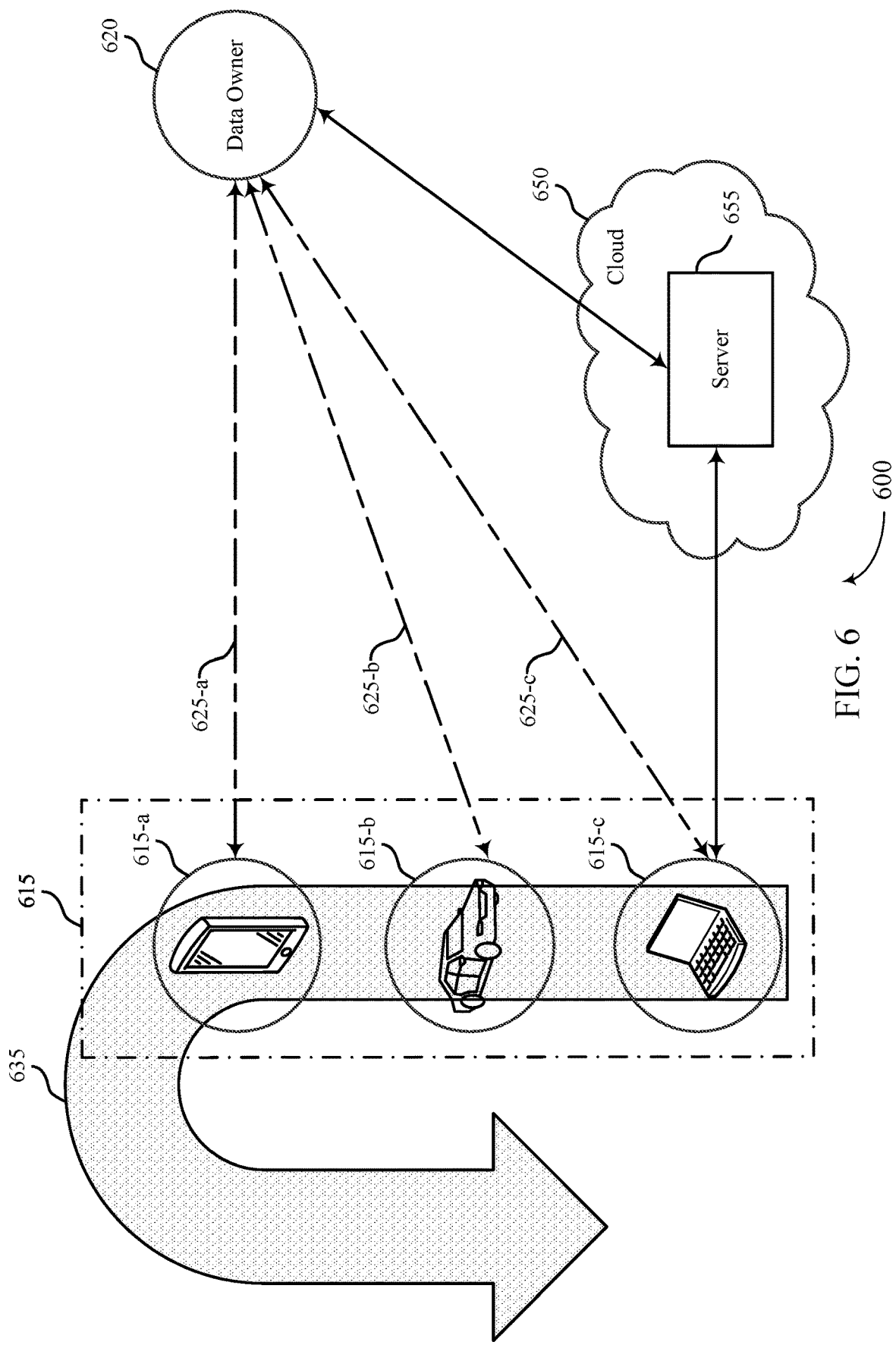
FIG. 6 illustrates an example of a system that supports secure multiparty computation for Internet of Things communications in accordance with aspects of the present disclosure.

FIG. 6 illustrates an example of a system 600 that supports efficient secure multiparty computation for Internet of Things communications in accordance with aspects of the present disclosure. In some examples, communication system 600 may implement aspects of communication system 100, 200, 300, 400, 500, and 800, which in some examples may be a wireless communication system. In the example of FIG. 6, the communication system 600 may include device 615-a, device 615-b, and device 615-c of device group 615, which may be an example of devices 115, devices 315, devices 415, or devices 515, as discussed in FIG. 1, FIG. 2, FIG. 3, FIG. 4, and FIG. 5. The devices as described herein may be wired or wireless devices, and in some cases the wireless devices may be a UE 815 as described in FIG. 8.

Similar to FIG. 5, each of the devices of the device group 615 may generate data. Each of the individual devices may perform a local computation with the locally generated data using the group profile and verification parameters provisioned by the node 620. The resulting data from the devices may not be shared yet. Each device may perform the same evaluation of the function provisioned in the group profile and at each step of the computation, the devices may share the multiplicative triple and the MAC share for the multiplicative function 635, such that each device may have an intermediate result. After the local evaluation is completed, then all the devices may share the local evaluation results and MAC key shares, which may collectively produce a single result to be verified using the MAC key. In some examples, the provisioning and sharing of data may vary due to the function being additive or multiplicative, and these variations will be discussed in further detail below.

In FIG. 6, each of the devices 615-$a$, 615-$b$, 615-$c$ may produce or generate data. In some examples, device 615-$a$ may individually produce or generate individual data ($x_1$, $y_1$), device 615-$b$ may individually produce or generate individual data ($x_2$, $y_2$), and device 615-$c$ may individually produce or generate individual data ($x_3$, $y_3$).

Additionally, in FIG. 6, to perform secure MPC, the devices may not share the individually produced data between each of the devices, but may instead share all of the individual generated data with the node 620. In some examples, the node 620 may be a device owner and/or a data owner. As illustrated in FIG. 6, device 615-$a$ may share the individual data ($x_1$, $y_1$), via the communications link 625-$a$, with the node 620. Device 615-$b$ may share the individual data ($x_2$, $y_2$) via the communications link 625-$b$, and similarly device 615-$c$ may share the individual data ($x_3$, $y_3$) via the communications link 625-$c$.

After the node 620 receives the individually produced data (e.g., ($x_n$, $y_n$)) from each of the respective devices of device group 615, the node 620 may generate evaluation parameters such as a MAC key, MAC key share, shared random parameters and a multiplicative triple, where the shared random parameter may be referred to as [r] and the multiplicative triples may be referred to as [a], [b], and [c]. The MAC key may be represented by alpha or $\alpha$, and the MAC key share may be referred to as the collective verification key and may be represented by alpha$_i$ or $\alpha_i$. The MAC key, $\alpha$, may be generated by combining all the received MAC key shares $\alpha_i$'s from each of the other individual devices. Similar to FIG. 5, in FIG. 6, the node 620 may then provision the MAC key shares, $\alpha_i$, and the MAC shares, $\gamma(x)_i$, $\gamma(y)_i$, to each of the individual devices. Additionally, because the function 635 is multiplicative, the node 620 may provision the evaluation parameters including the shared random parameter and the multiplicative triples to each of the devices of device group 615. In some examples, the shared random parameter may be employed for message authentication and the multiplicative triple may be used for function evaluation. After provisioning of the group profile and the evaluation parameters, the secure MPC may be performed as discussed herein. Continuing the discussion, the operations discussed may be performed as an independent function, but may also be part of the whole function 635. For example, Z may be the sums of individual Zs, or $Z=Z_1+Z_2+Z_3$ . . . and $Z_i$ may include the sharing of multiplicative triples and the calculation of MAC($z_i$). In some examples, MAC(Z) may be MAC($Z_1$)+MAC($Z_2$)+MAC($Z_3$)+ . . . .

In some examples, in which the function is multiplicative, the collective verification key may be generated by employing a secure MPC using the device-specific portions associated with each of the devices and the plurality of evaluation parameters. The device-specific portions associated with each of the devices may be the individually generated data which may be associated with each individual device that generated the data. The secure MPC may be employed by evaluating a function in an online phase of the MPC scheme and using the plurality of evaluation parameters received in a provisioning phase of the MPC.

As previously discussed, function 635 may be received by each of the devices of the device group 615 via the group profile and function 635 may be locally evaluated at each of the devices 615-$a$, 615-$b$, and 615-$c$. In FIG. 6, the function 635 may be a multiplicative function. While the device group continues to evaluate the function locally at each of the devices, the devices may share evaluation parameters (e.g., MAC share and the multiplicative triple) between each of the devices at each step of computing the function, thus obtaining an intermediate local evaluation result and intermediate verification parameter for sharing between each of the devices. Further, each device may perform the same evaluation of the function until the evaluation of the function 635 is complete, to produce a local evaluation result at each of the devices. After the evaluation of the function 635 is completed, the devices 615-$a$, 615-$b$, 615-$c$ may share the local evaluation results and verification parameters (e.g., MAC share) with each of the other devices.

The devices of device group 615 may each receive the local evaluation results and the verification parameters (e.g., MAC share) from each of the other data generating devices. In some examples, device 615-$a$ may construct a result Z, and verification parameter, which may be referred to herein as MAC of Z or represented by $\gamma(Z)$. The device 615-$a$ may then transmit or share its portion of the verification key (e.g., MAC key share, $\alpha_i$) provisioned by the node 620. The device 515-$a$ as well as the other devices 515-$b$, and 515-$b$ may all receive the other portions of the verification key from each of the other devices. The devices may then verify the result Z, using the MAC key (e.g., $\alpha$) and the verification parameter (e.g., MAC of Z or $\gamma(Z)$). The verification may be performed by validating $\gamma(Z)=\alpha*Z$.

In some examples, the devices 615-$a$, 615-$b$, and 615-$c$ may sign the data to guarantee and/or authenticate the provenance of the data. The device group 615 may collectively sign the data which may employ a multi-signature and/or threshold-signature scheme which may be more efficient than individual signatures. After evaluation of the function completes and the devices collectively agree on an output, the devices may collectively create a signature and collectively sign the data. The devices may then report the results to the cloud 650 and/or to a server 655. Further, in some examples, the data may be verified by the node 620 using the group private key between the server 655 and the node 620.

Figure 7:
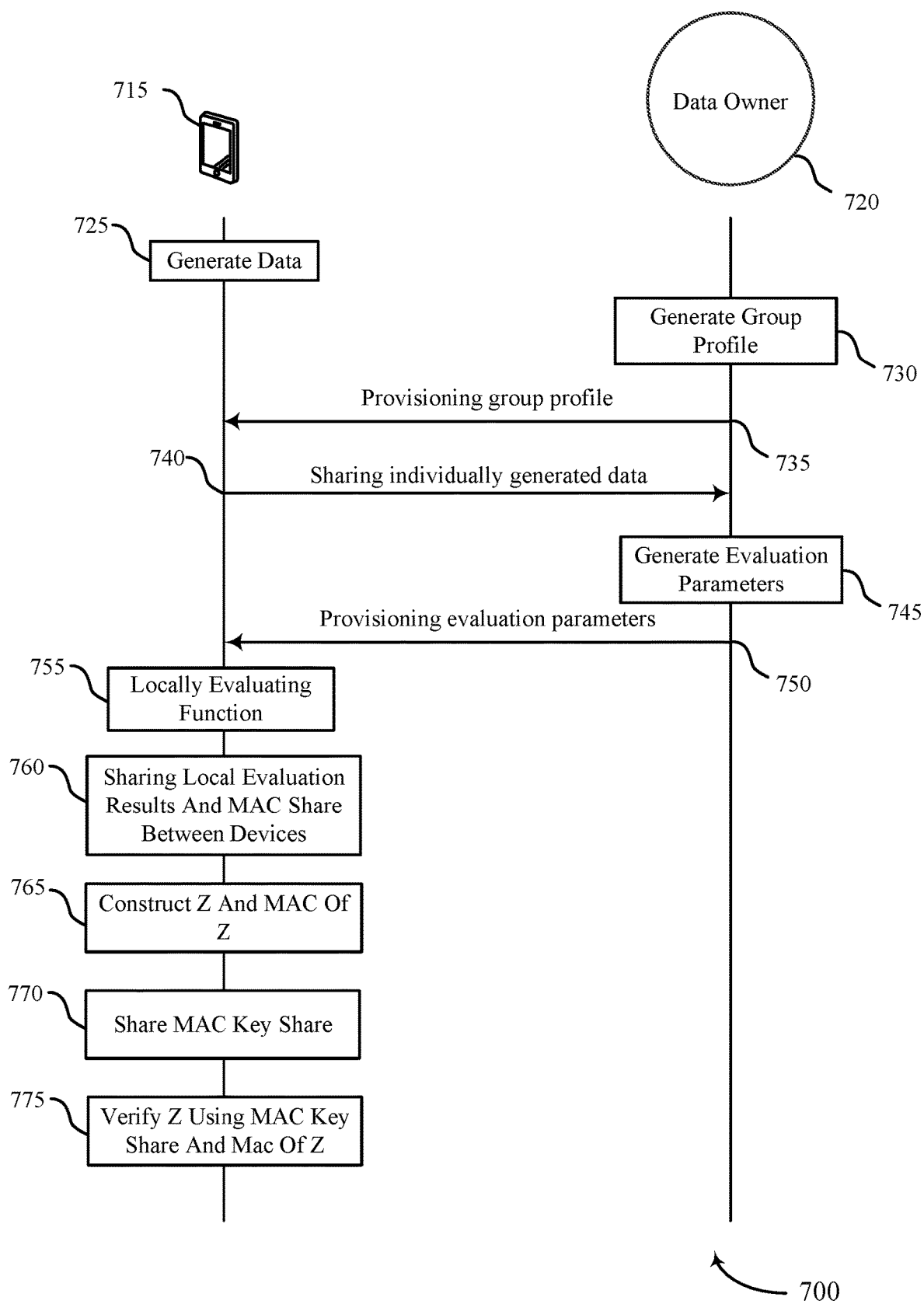
FIG. 7 illustrates an example of a process flow that supports secure multiparty computation for Internet of Things communications in accordance with aspects of the present disclosure.

FIG. 7 illustrates an example of a process flow 700 that supports efficient secure multiparty computation for Internet of Things communications in accordance with aspects of the present disclosure. In some examples, process flow 700 may implement aspects of communications system 100, 200, 300, 400, 500, 600, and 800, which in some examples may be a wireless communication system. In the example of FIG. 7, process flow 700 may include device group 715, which may be an example of devices 115, devices 315, devices 415, devices 515, or devices 615, as discussed in FIGS. 1 through 6. The devices as described herein may be wired or wireless devices, and in some cases the wireless devices may be a UE 815 as described in FIG. 8. The process flow 700 may depict the series of generating data, computations, and transmissions passing between the data generating device group 715 and the node 720.

In FIG. 7, the device group 715 may generate data at 725. The device group 715 may include individual devices that locally generate individual data. In some examples, the devices of the device group 715 may not share the individually generated data between the devices. At 730, the node 720 may generate the group profile. The group profile may include various information including, but not limited to, a group identification, device index, member list, credential(s), functions to evaluate at each of the individual devices, and so forth, and any combination thereof. The group profile may identify other devices to be included in collective data provenance generation with the existing devices and may additionally provide a function for generating device-specific portions of the collective data provenance information. Additionally, in the group profile, the group identity may identify the group, and may identify that the device or devices may provide collective data provenance information for data generated at the device or devices. The device index may identify a specific device where a device identification may also be used. A member list may include group member indices or identifiers and the credentials may be group member credentials (e.g., public keys). At 735, the node 720 may provision the group profile to each of the individual devices of the device group 715. In some examples, the node 720 may be a device owner and/or a data owner.

At 740, the individual devices of the device group may share the individually generated data with the node 720. Although the individually generated data may be shared with the node 720, this data may not be shared and/or disclosed between the individual devices that generated the data.

At 745, the node 720 may generate the evaluation parameters such as a message authentication code (MAC) key and MAC key share. The MAC key may be represented by alpha or $\alpha$, and the MAC key share may be referred to as the collective verification key and may be represented by alpha$_i$ or $\alpha_i$. The MAC key, $\alpha$, may be generated by combining all the received MAC key shares $\alpha_i$'s from each of the other individual devices. The node 720 may generate or create a MAC on data based on the individual data received from the individual devices. The node 720 may additionally generate or create MAC shares, $\gamma(x)_i$, $\gamma(y)_i$ to be provisioned to each of the individual devices. At 750, the node 720 may then provision the MAC key shares, $\alpha_i$, and the MAC shares, $\gamma(x)_i$, $\gamma(y)_i$, to each of the individual devices when the evaluated function 535 is additive.

Additionally, the generated evaluation parameters at 745 and the provisioned evaluation parameters may vary depending on the function. In some examples, the generated evaluation parameters may be the MAC key share, the MAC key, the shared random parameter, and the multiplicative triples when the function is multiplicative. Further, the MAC key share, the MAC key, the shared random parameter, and the multiplicative triples may be provisioned at 750 when the function is multiplicative.

At 755, each of the devices of the device group 715 may locally evaluate the function. After the function has been evaluated, at 760, each of the devices may share the local evaluation results and the MAC share between each of the devices when the function is additive. In some examples, when the function may be multiplicative, each of the devices may share the local evaluation results, the MAC share, and the multiplicative triple.

At 765, each device of the device group may construct Z and the MAC of Z using the shared local evaluation results and the MAC share and then at 770, each device of the device group may share the MAC key share with each of the other devices. This may allow the devices at 775 to verify Z using the MAC key share and the MAC of Z. The devices may then verify the result Z, using the MAC key (e.g., $\alpha$) and the verification parameter (e.g., MAC of Z or $\gamma(Z)$). The verification may be performed by validating $\gamma(Z)=\alpha*Z$.

Figure 8:
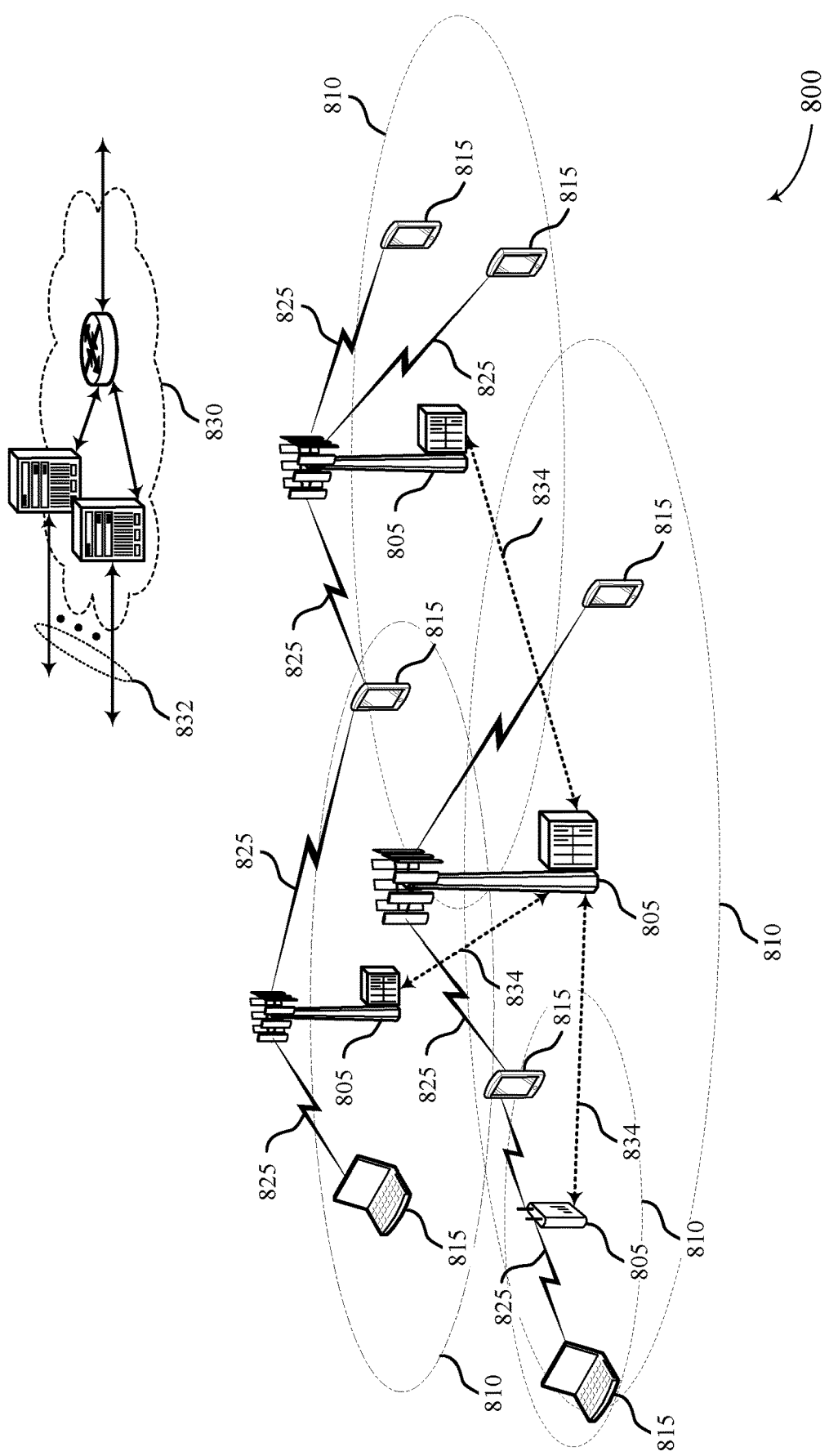
FIG. 8 illustrates an example of a system for wireless communications that supports secure multiparty computation for Internet of Things communications in accordance with aspects of the present disclosure.

FIG. 8 illustrates an example of a wireless communications system 800 that supports efficient secure multiparty computation for Internet of Things communications in accordance with aspects of the present disclosure. The wireless communications system 800 includes base stations 805, UEs 815, and a core network 830. In some examples, the wireless communications system 800 may be a Long Term Evolution (LTE) network, an LTE-Advanced (LTE-A) network, an LTE-A Pro network, or a New Radio (NR) network. In some cases, wireless communications system 800 may support enhanced broadband communications, ultra-reliable (e.g., mission critical) communications, low latency communications, or communications with low-cost and low-complexity devices. In some examples, the UEs 815 may be examples of the devices 115 described with reference to FIG. 1 and FIG. 2, or devices 315, 415, 515, 615, or 715 as described with reference to FIGS. 3, 4, 5, 6, and 7, respectively.

Base stations 805 may wirelessly communicate with UEs 815 via one or more base station antennas. Base stations 805 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 800 may include base stations 805 of different types (e.g., macro or small cell base stations). The UEs 815 described herein may be able to communicate with various types of base stations 805 and network equipment including macro eNBs, small cell eNBs, gNBs, relay base stations, and the like.

Each base station 805 may be associated with a particular geographic coverage area 810 in which communications with various UEs 815 is supported. Each base station 805 may provide communication coverage for a respective geographic coverage area 810 via communication links 825, and communication links 825 between a base station 805 and a UE 815 may utilize one or more carriers. Communication links 825 shown in wireless communications system 800 may include uplink transmissions from a UE 815 to a base station 805, or downlink transmissions from a base station 805 to a UE 815. Downlink transmissions may also be called forward link transmissions while uplink transmissions may also be called reverse link transmissions.

The geographic coverage area 810 for a base station 805 may be divided into sectors making up a portion of the geographic coverage area 810, and each sector may be associated with a cell. For example, each base station 805 may provide communication coverage for a macro cell, a small cell, a hot spot, or other types of cells, or various combinations thereof. In some examples, a base station 805 may be movable and therefore provide communication coverage for a moving geographic coverage area 810. In some examples, different geographic coverage areas 810 associated with different technologies may overlap, and overlapping geographic coverage areas 810 associated with different technologies may be supported by the same base station 805 or by different base stations 805. The wireless communications system 800 may include, for example, a heterogeneous LTE/LTE-A/LTE-A Pro or NR network in which different types of base stations 805 provide coverage for various geographic coverage areas 810.

The term "cell" refers to a logical communication entity used for communication with a base station 805 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 810 (e.g., a sector) over which the logical entity operates.

UEs 815 may be dispersed throughout the wireless communications system 800, and each UE 815 may be stationary or mobile. A UE 815 may also be referred to as a mobile device, a wireless device, a remote device, a handheld device, or a subscriber device, or some other suitable terminology, where the "device" may also be referred to as a unit, a station, a terminal, or a client. A UE 815 may also be a personal electronic device such as a cellular phone, a personal digital assistant (PDA), a tablet computer, a laptop computer, or a personal computer. In some examples, a UE 815 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 815, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 805 without human intervention. In some examples, M2M communication or MTC may include communications from devices that integrate sensors or meters to measure or capture information and relay that information to a central server or application program that can make use of the information or present the information to humans interacting with the program or application. Some UEs 815 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 815 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 815 include entering a power saving "deep sleep" mode when not engaging in active communications, or operating over a limited bandwidth (e.g., according to narrowband communications). In some cases, UEs 815 may be designed to support critical functions (e.g., mission critical functions), and a wireless communications system 800 may be configured to provide ultra-reliable communications for these functions.

In some cases, a UE 815 may also be able to communicate directly with other UEs 815 (e.g., using a peer-to-peer (P2P) or device-to-device (D2D) protocol). One or more of a group of UEs 815 utilizing D2D communications may be within the geographic coverage area 810 of a base station 805. Other UEs 815 in such a group may be outside the geographic coverage area 810 of a base station 805, or be otherwise unable to receive transmissions from a base station 805. In some cases, groups of UEs 815 communicating via D2D communications may utilize a one-to-many (1:M) system in which each UE 815 transmits to every other UE 815 in the group. In some cases, a base station 805 facilitates the scheduling of resources for D2D communications. In other cases, D2D communications are carried out between UEs 815 without the involvement of a base station 805.

Base stations 805 may communicate with the core network 830 and with one another. For example, base stations 805 may interface with the core network 830 through backhaul links 832 (e.g., via an S1, N2, N3, or other interface). Base stations 805 may communicate with one another over backhaul links 834 (e.g., via an X2, Xn, or other interface) either directly (e.g., directly between base stations 805) or indirectly (e.g., via core network 830).

The core network 830 may provide user authentication, access authorization, tracking, Internet Protocol (IP) connectivity, and other access, routing, or mobility functions. The core network 830 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 815 served by base stations 805 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 805, may include subcomponents such as an access network entity, which may be an example of an access node controller (ANC). Each access network entity may communicate with UEs 815 through a number of other access network transmission entities, which may be referred to as a radio head, a smart radio head, or a transmission/reception point (TRP). In some configurations, various functions of each access network entity or base station 805 may be distributed across various network devices (e.g., radio heads and access network controllers) or consolidated into a single network device (e.g., a base station 805).

Wireless communications system 800 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 815 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 800 may also operate in a super high frequency (SHF) region using frequency bands from 3 GHz to 30 GHz, also known as the centimeter band.

The SHF region includes bands such as the 5 GHz industrial, scientific, and medical (ISM) bands, which may be used opportunistically by devices that may be capable of tolerating interference from other users.

Wireless communications system 800 may also operate in an extremely high frequency (EHF) region of the spectrum (e.g., from 30 GHz to 300 GHz), also known as the millimeter band. In some examples, wireless communications system 800 may support millimeter wave (mmW) communications between UEs 815 and base stations 805, and EHF antennas of the respective devices may be even smaller and more closely spaced than UHF antennas. In some cases, this may facilitate use of antenna arrays within a UE 815. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 800 may utilize both licensed and unlicensed radio frequency spectrum bands. For example, wireless communications system 800 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 805 and UEs 815 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 805 or UE 815 may be equipped with multiple antennas, which may be used to employ techniques such as transmit diversity, receive diversity, multiple-input multiple-output (MIMO) communications, or beamforming. For example, wireless communications system 800 may use a transmission scheme between a transmitting device (e.g., a base station 805) and a receiving device (e.g., a UE 815), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 805 or a UE 815) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 805 may use multiple antennas or antenna arrays to conduct beamforming operations for directional communications with a UE 815. For instance, some signals (e.g. synchronization signals, reference signals, beam selection signals, or other control signals) may be transmitted by a base station 805 multiple times in different directions, which may include a signal being transmitted according to different beamforming weight sets associated with different directions of transmission. Transmissions in different beam directions may be used to identify (e.g., by the base station 805 or a receiving device, such as a UE 815) a beam direction for subsequent transmission and/or reception by the base station 805.

Some signals, such as data signals associated with a particular receiving device, may be transmitted by a base station 805 in a single beam direction (e.g., a direction associated with the receiving device, such as a UE 815). In some examples, the beam direction associated with transmissions along a single beam direction may be determined based at least in in part on a signal that was transmitted in different beam directions. For example, a UE 815 may receive one or more of the signals transmitted by the base station 805 in different directions, and the UE 815 may report to the base station 805 an indication of the signal it received with a highest signal quality, or an otherwise acceptable signal quality. Although these techniques are described with reference to signals transmitted in one or more directions by a base station 805, a UE 815 may employ similar techniques for transmitting signals multiple times in different directions (e.g., for identifying a beam direction for subsequent transmission or reception by the UE 815), or transmitting a signal in a single direction (e.g., for transmitting data to a receiving device).

A receiving device (e.g., a UE 815, which may be an example of a mmW receiving device) may try multiple receive beams when receiving various signals from the base station 805, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 805 or UE 815 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 805 may be located in diverse geographic locations. A base station 805 may have an antenna array with a number of rows and columns of antenna ports that the base station 805 may use to support beamforming of communications with a UE 815. Likewise, a UE 815 may have one or more antenna arrays that may support various MIMO or beamforming operations.

In some cases, wireless communications system 800 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 815 and a base station 805 or core network 830 supporting radio bearers for user plane data. At the Physical layer, transport channels may be mapped to physical channels.

In some cases, UEs 815 and base stations 805 may support retransmissions of data to increase the likelihood that data is received successfully. HARQ feedback is one technique of increasing the likelihood that data is received correctly over a communication link 825. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 815 and a base station 805.

The term "carrier" refers to a set of radio frequency spectrum resources having a defined physical layer structure for supporting communications over a communication link 825. For example, a carrier of a communication link 825 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 815. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 800. For example, the carrier bandwidth may be one of a number of predetermined bandwidths for carriers of a particular radio access technology (e.g., 1.4, 3, 5, 10, 15, 20, 40, or 80 MHz). In some examples, each served UE 815 may be configured for operating over portions or all of the carrier bandwidth. In other examples, some UEs 815 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 815 receives and the higher the order of the modulation scheme, the higher the data rate may be for the UE 815. In MIMO systems, a wireless communications resource may refer to a combination of a radio frequency spectrum resource, a time resource, and a spatial resource (e.g., spatial layers), and the use of multiple spatial layers may further increase the data rate for communications with a UE 815.

Devices of the wireless communications system 800 (e.g., base stations 805 or UEs 815) may have a hardware configuration that supports communications over a particular carrier bandwidth, or may be configurable to support communications over one of a set of carrier bandwidths. In some examples, the wireless communications system 800 may include base stations 805 and/or UEs 815 that support simultaneous communications via carriers associated with more than one different carrier bandwidth.

Wireless communications system 800 may support communication with a UE 815 on multiple cells or carriers, a feature which may be referred to as carrier aggregation or multi-carrier operation. A UE 815 may be configured with multiple downlink component carriers and one or more uplink component carriers according to a carrier aggregation configuration. Carrier aggregation may be used with both FDD and TDD component carriers.

In some cases, wireless communications system 800 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 815 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 815 or base station 805, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 800 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 9:
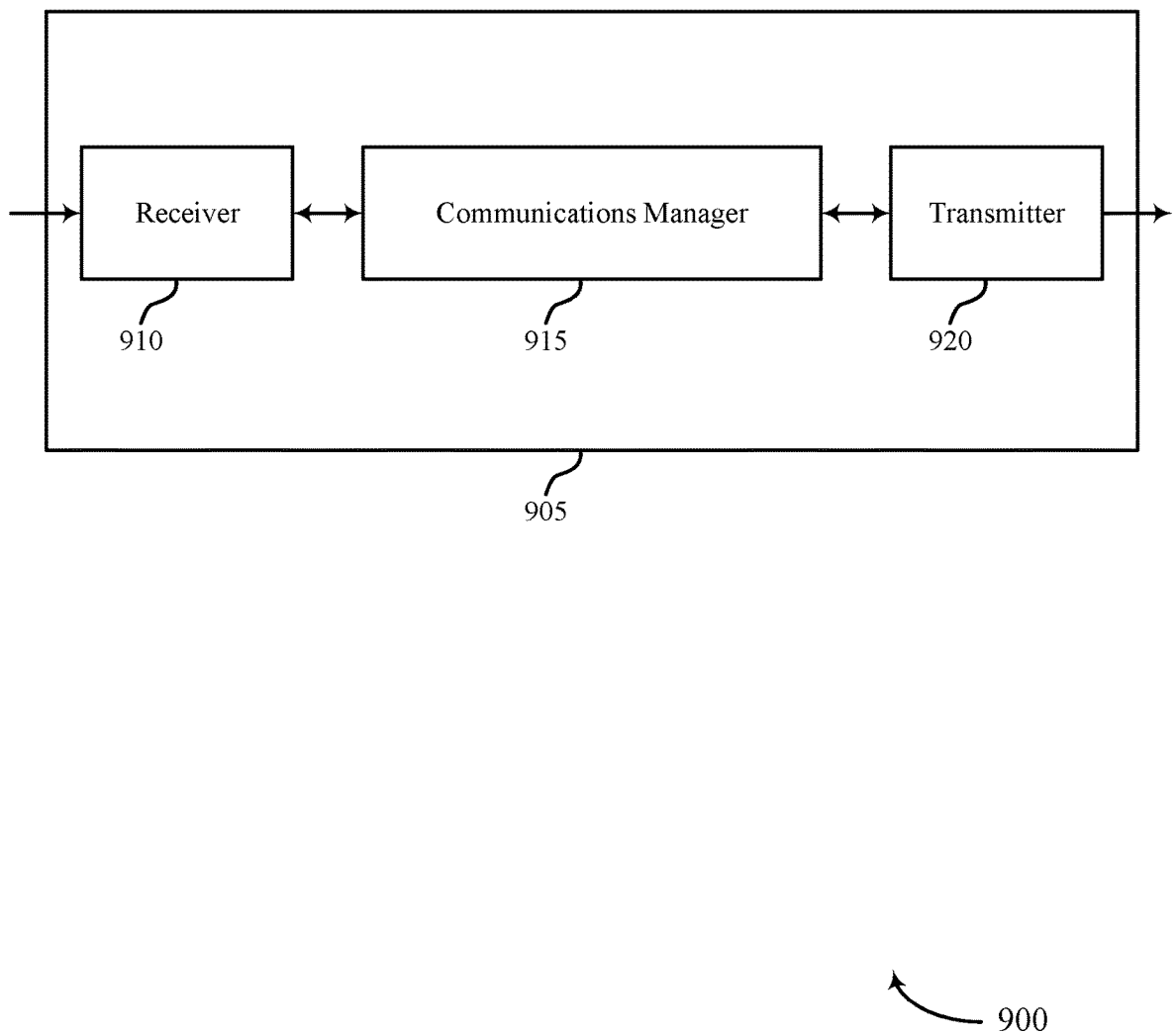
FIGS. 9 and 10 show block diagrams of devices that support secure multiparty computation for Internet of Things communications in accordance with aspects of the present disclosure.

FIG. 9 shows a block diagram 900 of a device 905 that supports efficient secure multiparty computation for Internet of Things communications in accordance with aspects of the present disclosure. The device 905 may be an example of aspects of a device as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to secure multiparty computation for internet of things communications). Information may be passed on to other components of the device 905. The receiver 910 may be an example of aspects of the transceiver 1220 described with reference to FIG. 11. The receiver 910 may utilize a single antenna or a set of antennas.

The communications manager 915 may identify that the device is to provide collective data provenance information for data generated at the device and at other devices, with a first portion of the data being generated at the device and with additional portions of the data being generated at the other devices. The communications manager 915 may receive a group profile, from the node, which identifies the other devices to be included in collective data provenance generation with the device, and also may receive, from the node, a set of evaluation parameters for generating collective data provenance information, the set of evaluation parameters being based on the first portion of the data and on the additional portions of the data. Additionally, the communications manager 915 may transmit the first portion of the data to a node associated with the devices identified by the group profile, generate a verification parameter of the collective data provenance information based on the first portion of the data, the additional portions of the data, and on the set of evaluation parameters, and generate a collective verification key by combining device-specific verification keys associated with each of the other devices. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
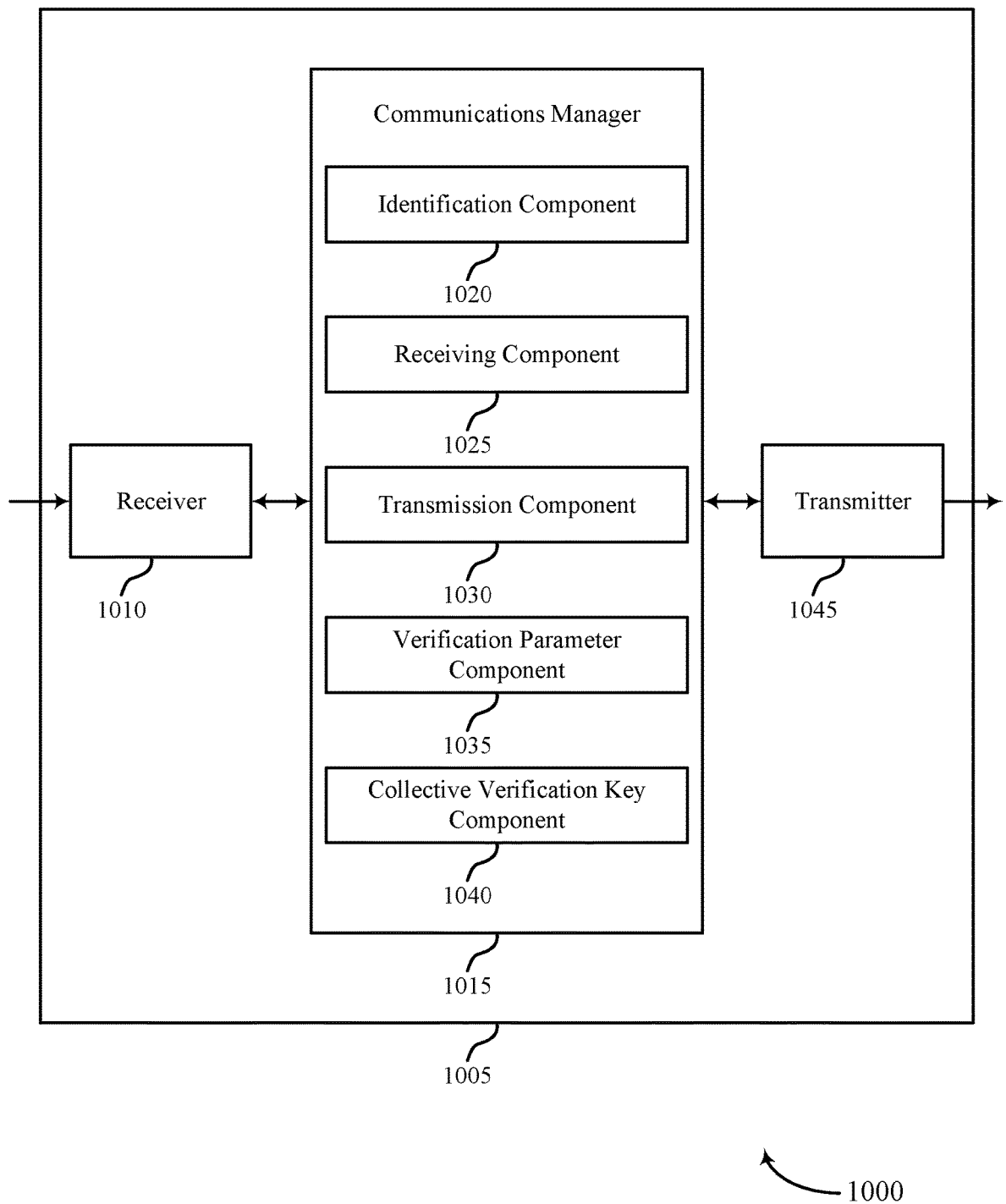

FIG. 10 shows a block diagram 1000 of a device 1005 that supports efficient secure multiparty computation for Internet of Things communications in accordance with aspects of the present disclosure. The device 1005 may be an example of aspects of a device 905 or a device 115 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to secure multiparty computation for internet of things communications). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an identification component 1020, a receiving component 1025, a transmission component 1030, a verification parameter component 1035, and a collective verification key component 1040. The communications manager 1015 may be an example of aspects of the communications manager 1210 described herein.

The identification component 1020 may identify that the device is to provide collective data provenance information for data generated at the device and at other devices, with a first portion of the data being generated at the device and with additional portions of the data being generated at the other devices.

The receiving component 1025 may receive a group profile from the node, which identifies the other devices to be included in collective data provenance generation with the device and receive, from the node, a set of evaluation parameters for generating collective data provenance information, the set of evaluation parameters being based on the first portion of the data and on the additional portions of the data.

The transmission component 1030 may transmit the first portion of the data to a node associated with the devices identified by the group profile.

The verification parameter component 1035 may generate a verification parameter of the collective data provenance information based on the first portion of the data, the additional portions of the data, and on the set of evaluation parameters.

The collective verification key component 1040 may generate a collective verification key by combining device-specific verification keys associated with each of the other devices.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
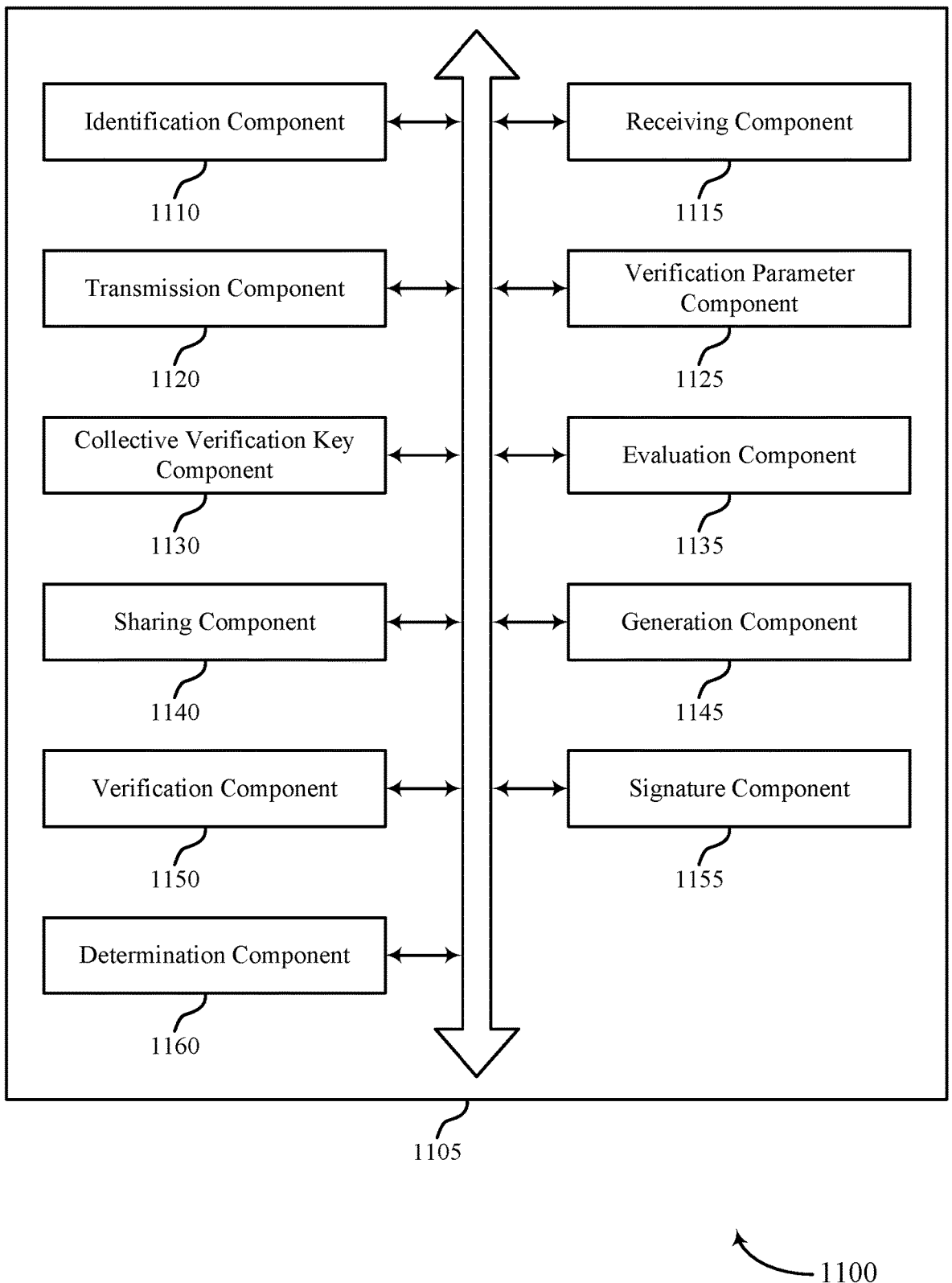
FIG. 11 shows a block diagram of a communications manager that supports secure multiparty computation for Internet of Things communications in accordance with aspects of the present disclosure.

FIG. 11 shows a block diagram 1100 of a communications manager 1105 that supports efficient secure multiparty computation for Internet of Things communications in accordance with aspects of the present disclosure. The communications manager 1105 may be an example of aspects of a communications manager 915, a communications manager 1015, or a communications manager 1210 described herein. The communications manager 1105 may include an identification component 1110, a receiving component 1115, a transmission component 1120, a verification parameter component 1125, a collective verification key component 1130, an evaluation component 1135, a sharing component 1140, a generation component 1145, a verification component 1150, a signature component 1155, and a determination component 1160. Each of these modules may communicate, directly or indirectly, with one another (e.g., via one or more buses).

The identification component 1110 may identify that the device is to provide collective data provenance information for data generated at the device and at other devices, with a first portion of the data being generated at the device and with additional portions of the data being generated at the other devices. In some examples, the identification component 1110 may identify that a predetermined event has occurred, where the predetermined event triggers the collective data provenance generation. In some examples, the identification component 1110 may identify group profile parameters used for generating collective data at the devices.

The receiving component 1115 may receive a group profile from the node, which identifies the other devices to be included in collective data provenance generation with the device. In some examples, the receiving component 1115 may receive, from the node, a set of evaluation parameters for generating collective data provenance information, the set of evaluation parameters being based on the first portion of the data and on the additional portions of the data.

In some examples, the receiving component 1115 may receive, from the node, an indication to provide the collective data provenance information. In some cases, the receiving component 1115 may receive, with the group profile, a function for generating device-specific portions of the collective data provenance information. In some aspects, the receiving component 1115 may receive the respective local evaluation results from the other devices. In some examples, the receiving component 1115 may receive, at each of the devices, at least one of a MAC share, a MAC key share, a shared random parameter, or a multiplicative triple.

The transmission component 1120 may transmit the first portion of the data to a node associated with the devices identified by the group profile. In some examples, the transmission component 1120 may transmit the data signed with the collective data provenance information to a server.

The verification parameter component 1125 may generate a verification parameter of the collective data provenance information based on the first portion of the data, the additional portions of the data, and on the set of evaluation parameters.

The collective verification key component 1130 may generate a collective verification key by combining device-specific verification keys associated with each of the other devices. In some examples, the collective verification key component 1130 may generate the collective verification key using the shared individual verification keys.

The evaluation component 1135 may locally evaluate the function at the device to generate a local evaluation result, based on the first portion of the data. In some examples, the evaluation component 1135 may evaluate a function in an online phase of the multiparty computation scheme and using the set of evaluation parameters received in a provisioning phase of the multiparty computation scheme.

The sharing component 1140 may share the local evaluation result and a corresponding intermediate verification parameter between the devices. In some examples, the sharing component 1140 may share individual verification keys corresponding to each of the individual devices, between each of the devices, based on receiving, the set of evaluation parameters. In some cases, the sharing component 1140 may share the collective data provenance information between each of the devices, based on verifying the provenance of the collective data provenance information.

The generation component 1145 may generate a collective evaluation result, based on the local evaluation result. In some examples, the generation component 1145 may employ a multiparty computation scheme using device-specific portions associated with each of the devices and the set of evaluation parameters.

The verification component 1150 may verify the collective evaluation result using the collective verification key and the verification parameter. In some examples, the verification component 1150 may verify an authenticity of the data collectively generated through evaluation of a message authentication code received for each of the other devices.

The signature component 1155 may sign the data using the collective data provenance information.

The determination component 1160 may determine, based on the identified group profile parameters, how the device and the other devices are to generate collective data provenance information.

Figure 12:
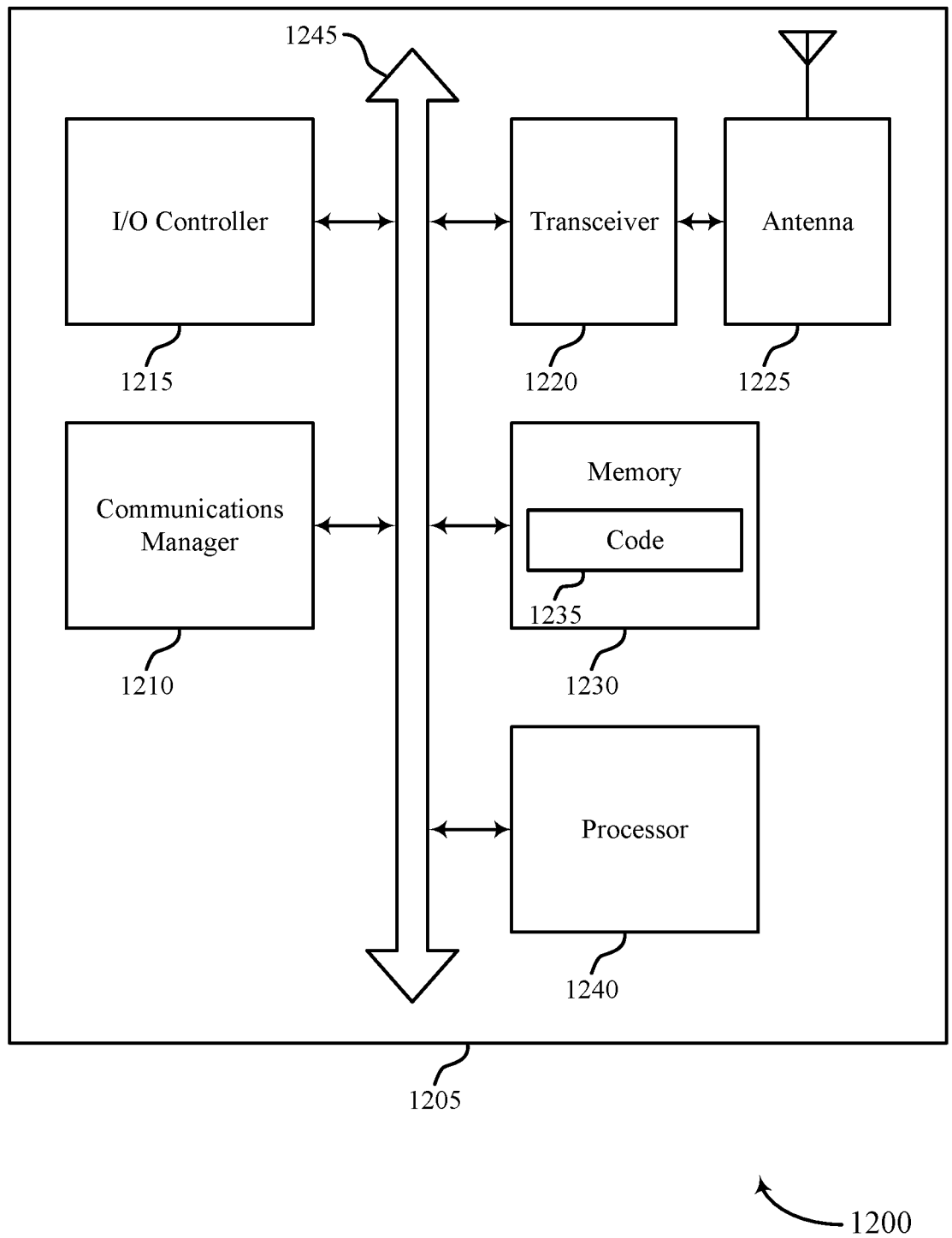
FIG. 12 shows a diagram of a system including a device that supports secure multiparty computation for Internet of Things communications in accordance with aspects of the present disclosure.

FIG. 12 shows a diagram of a system 1200 including a device 1205 that supports efficient secure multiparty computation for Internet of Things communications in accordance with aspects of the present disclosure. The device 1205 may be an example of or include the components of device 905, device 1005, or a device as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may identify that the device is to provide collective data provenance information for data generated at the device and at other devices, with a first portion of the data being generated at the device and with additional portions of the data being generated at the other devices. The communications manager 1210 may receive a group profile, from the node, which identifies the other devices to be included in collective data provenance generation with the device, and may also receive, from the node, a set of evaluation parameters for generating collective data provenance information, the set of evaluation parameters being based on the first portion of the data and on the additional portions of the data. Additionally, the communications manager 1210 may transmit the first portion of the data to a node associated with the devices identified by the group profile, generate a verification parameter of the collective data provenance information based on the first portion of the data, the additional portions of the data, and on the set of evaluation parameters, and generate a collective verification key by combining device-specific verification keys associated with each of the other devices.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting secure multiparty computation for internet of things communications).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
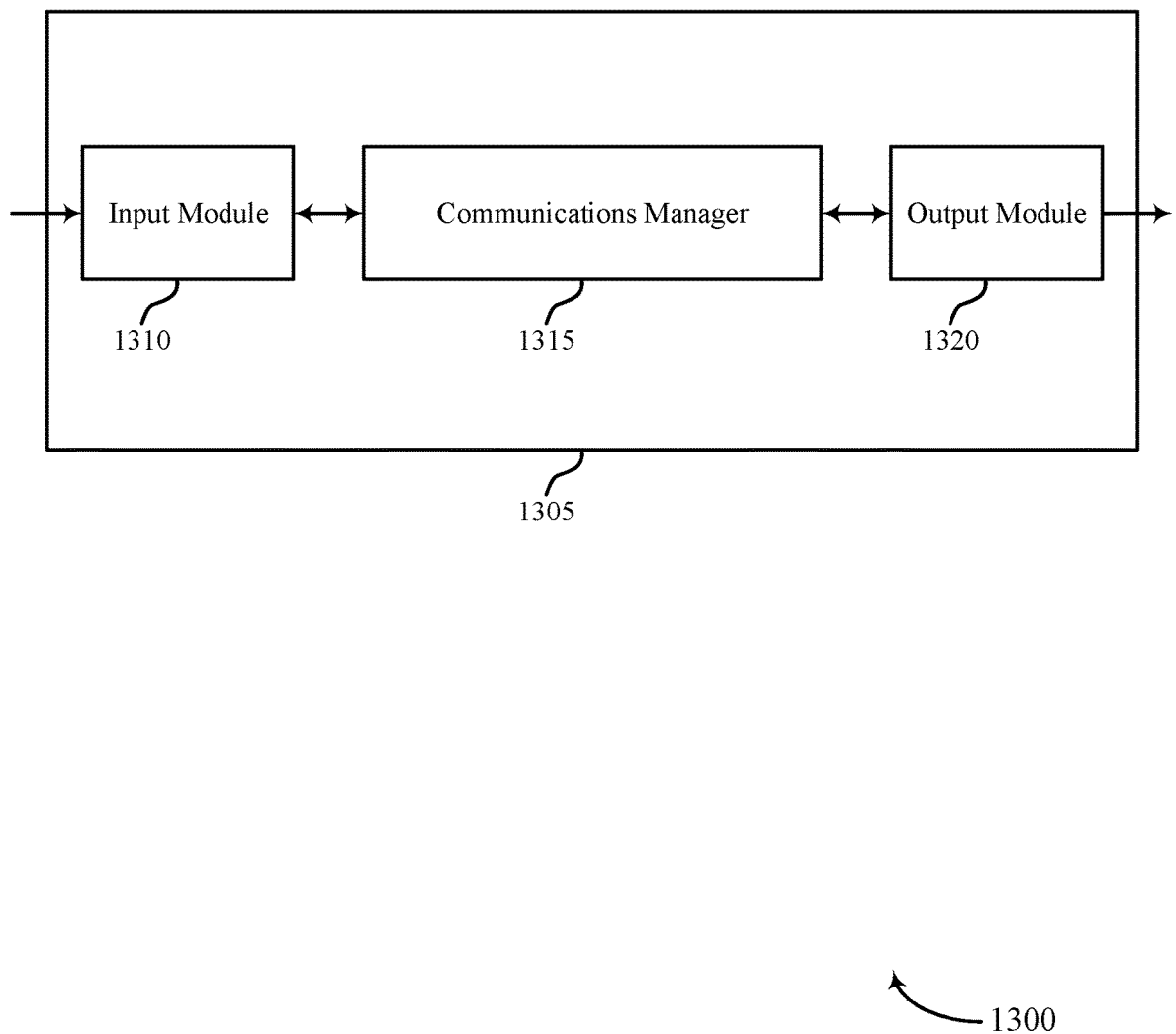
FIGS. 13 and 14 show block diagrams of devices that support secure multiparty computation for Internet of Things communications in accordance with aspects of the present disclosure.

FIG. 13 shows a block diagram 1300 of a device 1305 that supports efficient secure multiparty computation for Internet of Things communications in accordance with aspects of the present disclosure. The device 1305 may be an example of aspects of a node as described herein. The device 1305 may include an input module 1310, a communications manager 1315, and an output module 1320. The device 1305 may also include a processor. Each of these components may be in communication with one another (e.g., via one or more buses).

The input module 1310 may manage input signals for the device 1305. For example, the input module 1310 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 1310 may send aspects of these input signals to other components of the device 1305 for processing. For example, the input module 1310 may transmit input signals to the communications manager 1315 to support Secure multiparty computation for Internet of Things Communications. In some cases, the input module 1310 may be a component of an input/output (I/O) controller 1615 as described with reference to FIG. 16.

The communications manager 1315 may identify a device group for collectively providing data provenance information for data generated at the device group to a third party, and may provision a group profile, from the node, to the device group. The communications manager 1315 may provision, to the device group, a set of evaluation parameters for generating collective data provenance information, the set of evaluation parameters being based on the data from the device group, and may also receive, at the node, data from the device group, with individual portions of the data being generated at individual devices. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The output module 1320 may manage output signals for the device 1305. For example, the output module 1320 may receive signals from other components of the device 1305, such as the communications manager 1315, and may transmit these signals to other components or devices. In some specific examples, the output module 1320 may transmit output signals for display in a user interface, for storage in a database or data store, for further processing at a server or server cluster, or for any other processes at any number of devices or systems. In some cases, the output module 1320 may be a component of an I/O controller 1615 as described with reference to FIG. 16.

Figure 14:
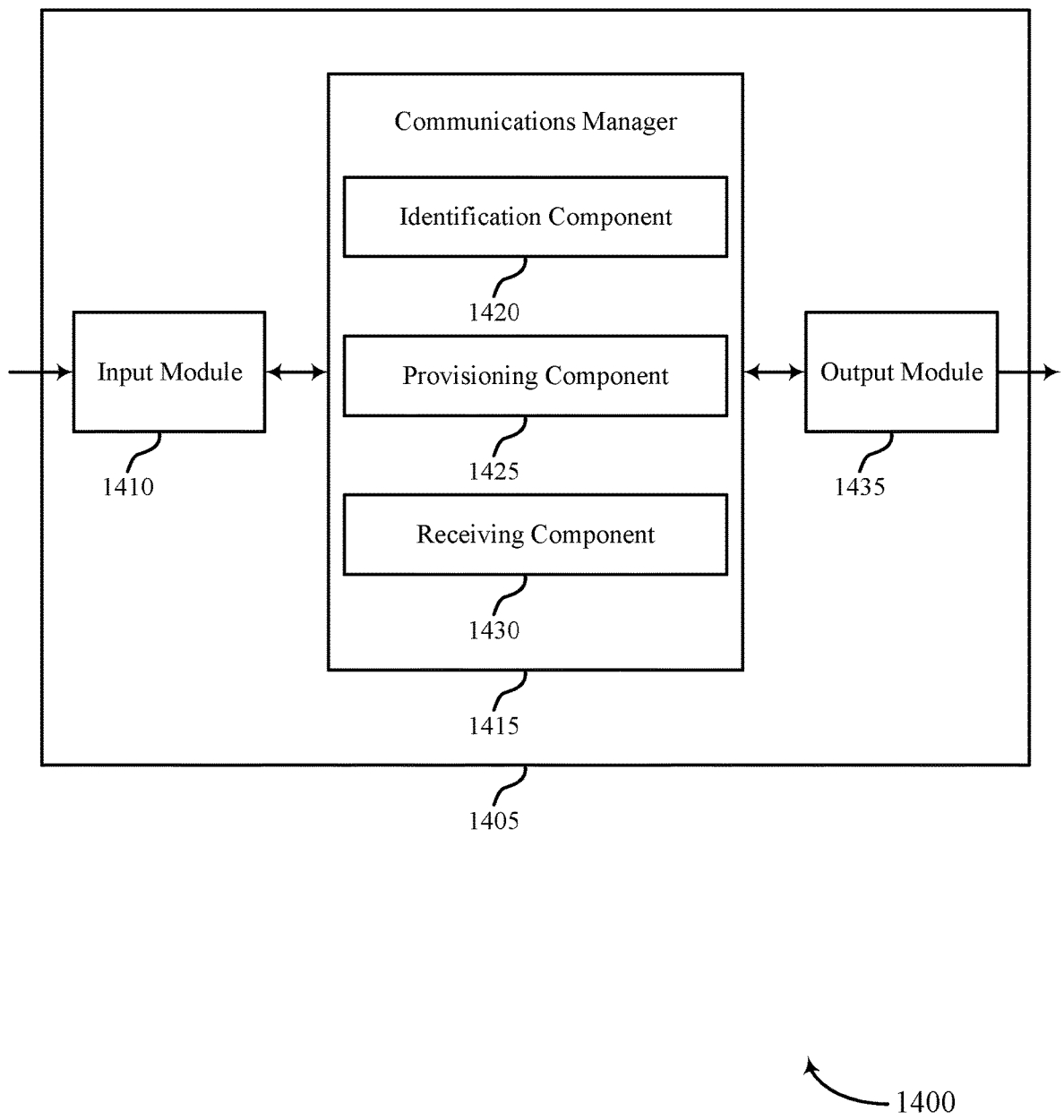

FIG. 14 shows a block diagram 1400 of a device 1405 that supports efficient secure multiparty computation for Internet of Things communications in accordance with aspects of the present disclosure. The device 1405 may be an example of aspects of a node as described herein. The device 1405 may include an input module 1410, a communications manager 1415, and an output module 1435. The device 1405 may also include a processor. Each of these components may be in communication with one another (e.g., via one or more buses).

The input module 1410 may manage input signals for the device 1405. For example, the input module 1410 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 1410 may send aspects of these input signals to other components of the device 1405 for processing. For example, the input module 1410 may transmit input signals to the communications manager 1415 to support Secure multiparty computation for Internet of Things Communications. In some cases, the input module 1410 may be a component of an input/output (I/O) controller 1615 as described with reference to FIG. 16.

The communications manager 1415 may be an example of aspects of the communications manager 1315 as described herein. The communications manager 1415 may include an identification component 1420, a provisioning component 1425, and a receiving component 1430. The communications manager 1415 may be an example of aspects of the communications manager 1610 described herein.

The identification component 1420 may identify a device group for collectively providing data provenance information for data generated at the device group to a third party.

The provisioning component 1425 may provision a group profile, from the node, to the device group and provision, to the device group, a set of evaluation parameters for generating collective data provenance information, the set of evaluation parameters being based on the data from the device group.

The receiving component 1430 may receive, at the node, data from the device group, with individual portions of the data being generated at individual devices.

The output module 1435 may manage output signals for the device 1405. For example, the output module 1435 may receive signals from other components of the device 1405, such as the communications manager 1415, and may transmit these signals to other components or devices. In some specific examples, the output module 1435 may transmit output signals for display in a user interface, for storage in a database or data store, for further processing at a server or server cluster, or for any other processes at any number of devices or systems. In some cases, the output module 1435 may be a component of an I/O controller 1615 as described with reference to FIG. 16.

Figure 15:
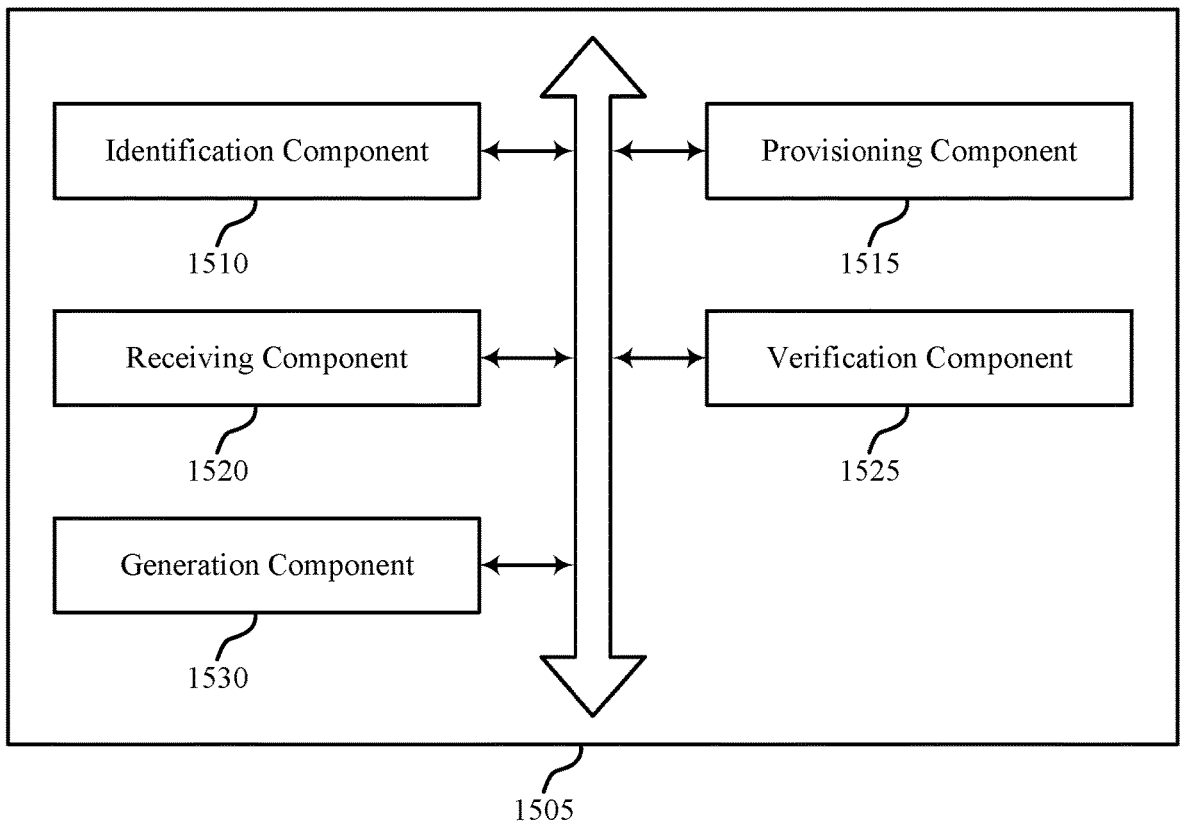
FIG. 15 shows a block diagram of a communications manager that supports secure multiparty computation for internet of things communications in accordance with aspects of the present disclosure.

FIG. 15 shows a block diagram 1500 of a communications manager 1505 that supports efficient secure multiparty computation for Internet of Things communications in accordance with aspects of the present disclosure. The communications manager 1505 may be an example of aspects of a communications manager 1315, a communications manager 1415, or a communications manager 1610 described herein. The communications manager 1505 may include an identification component 1510, a provisioning component 1515, a receiving component 1520, a verification component 1525, and a generation component 1530. Each of these modules may communicate, directly or indirectly, with one another (e.g., via one or more buses).

The identification component 1510 may identify a device group for collectively providing data provenance information for data generated at the device group to a third party.

The provisioning component 1515 may provision a group profile from the node to the device group. In some examples, the provisioning component 1515 may provision, to the device group, a set of evaluation parameters for generating collective data provenance information, the set of evaluation parameters being based on the data from the device group.

In some aspects, the provisioning component 1515 may provision, to the device group, at least one of a group identity, a device index, a member list, group credentials, or a function for generating the collective data provenance information of the data generated at the device group. In some examples, the provisioning component 1515 may provision, to the device group, at least one of a message authentication code (MAC) share, a MAC key share, a shared random parameter, or a multiplicative triple.

The receiving component 1520 may receive, at the node, data from the device group, with individual portions of the data being generated at individual devices.

The verification component 1525 may verify an authenticity of the data collectively generated through evaluation of a message authentication code received for each of the other devices, using a group public key.

The generation component 1530 may generate at least one of a message authentication code (MAC) key and a MAC key share for provisioning to the device group. In some examples, the generation component 1530 may generate a MAC on data based on the data received from the device group. In some cases, the generation component 1530 may generate a MAC share based on creating the MAC on data for provisioning to the device group. In some implementations, the generation component 1530 may generate at least one of a shared random parameter or a multiplicative triple for provisioning to the device group.

Figure 16:
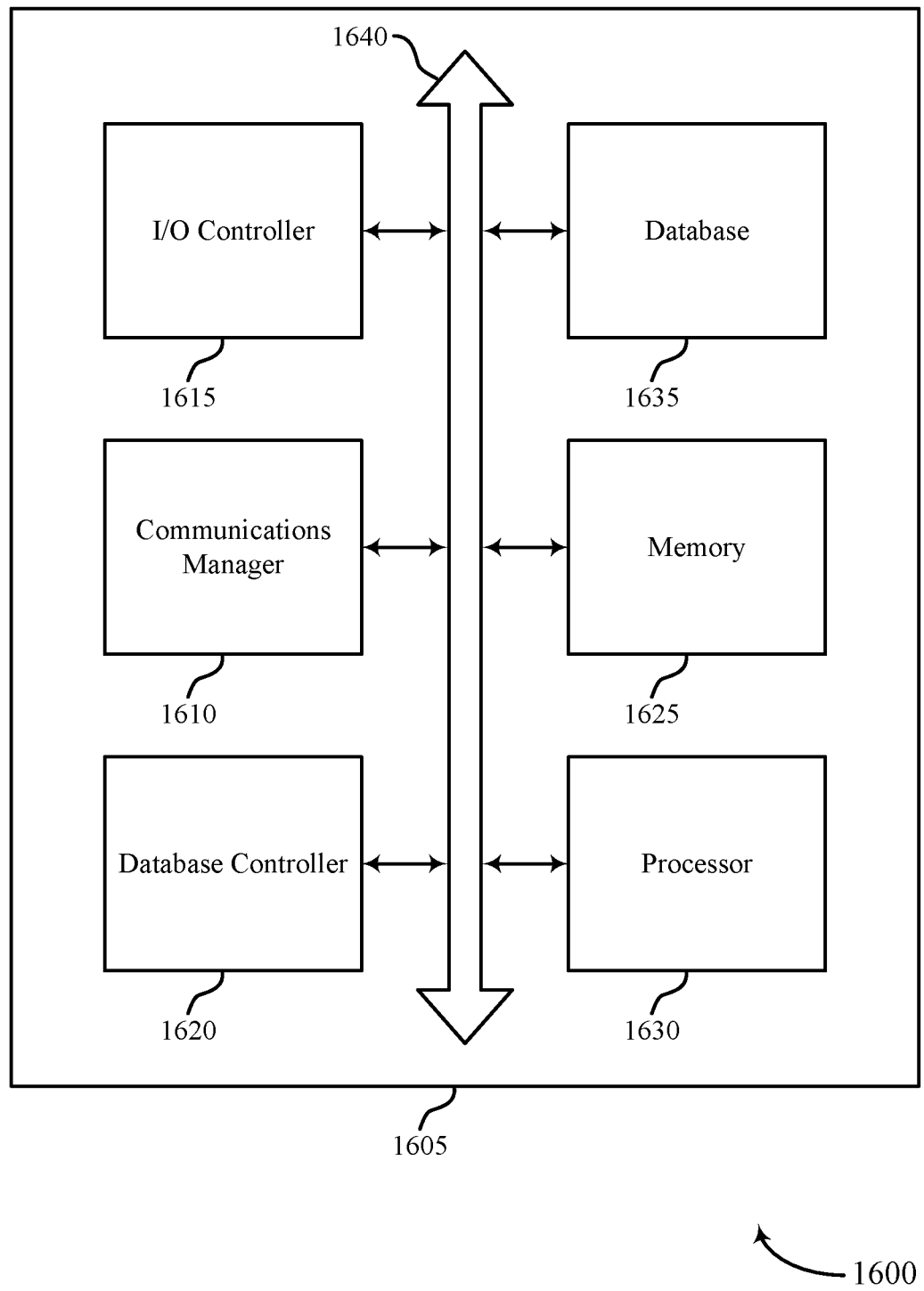
FIG. 16 shows a diagram of a system including a device that supports secure multiparty computation for Internet of Things communications in accordance with aspects of the present disclosure.

FIG. 16 shows a diagram of a system 1600 including a device 1605 that supports efficient secure multiparty computation for Internet of Things communications in accordance with aspects of the present disclosure. The device 1605 may be an example of or include the components of device 1305, device 1405, or a node as described herein. The device 1605 may include components for bi-directional voice and data communications including components for transmitting and receiving communications, including a communications manager 1610, an I/O controller 1615, a database controller 1620, memory 1625, a processor 1630, and a database 1635. These components may be in electronic communication via one or more buses (e.g., bus 1640).

The communications manager 1610 may identify a device group for collectively providing data provenance information for data generated at the device group to a third party, and may provision a group profile, from the node, to the device group. The communications manager 1610 may also provision, to the device group, a set of evaluation parameters for generating collective data provenance information, the set of evaluation parameters being based on the data from the device group, and may receive, at the node, data from the device group, with individual portions of the data being generated at individual devices.

The I/O controller 1615 may manage input signals 1645 and output signals 1650 for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The database controller 1620 may manage data storage and processing in a database 1635. In some cases, a user may interact with the database controller 1620. In other cases, the database controller 1620 may operate automatically without user interaction. The database 1635 may be an example of a single database, a distributed database, multiple distributed databases, a data store, a data lake, or an emergency backup database.

Memory 1625 may include random-access memory (RAM) and read-only memory (ROM). The memory 1625 may store computer-readable, computer-executable software including instructions that, when executed, cause the processor to perform various functions described herein. In some cases, the memory 1625 may contain, among other things, a basic input/output system (BIOS) which may control basic hardware or software operation such as the interaction with peripheral components or devices.

The processor 1630 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1630 may be configured to operate a memory array using a memory controller. In other cases, a memory controller may be integrated into the processor 1630. The processor 1630 may be configured to execute computer-readable instructions stored in a memory 1625 to perform various functions (e.g., functions or tasks supporting secure multiparty computation for internet of things communications).

Figure 17:
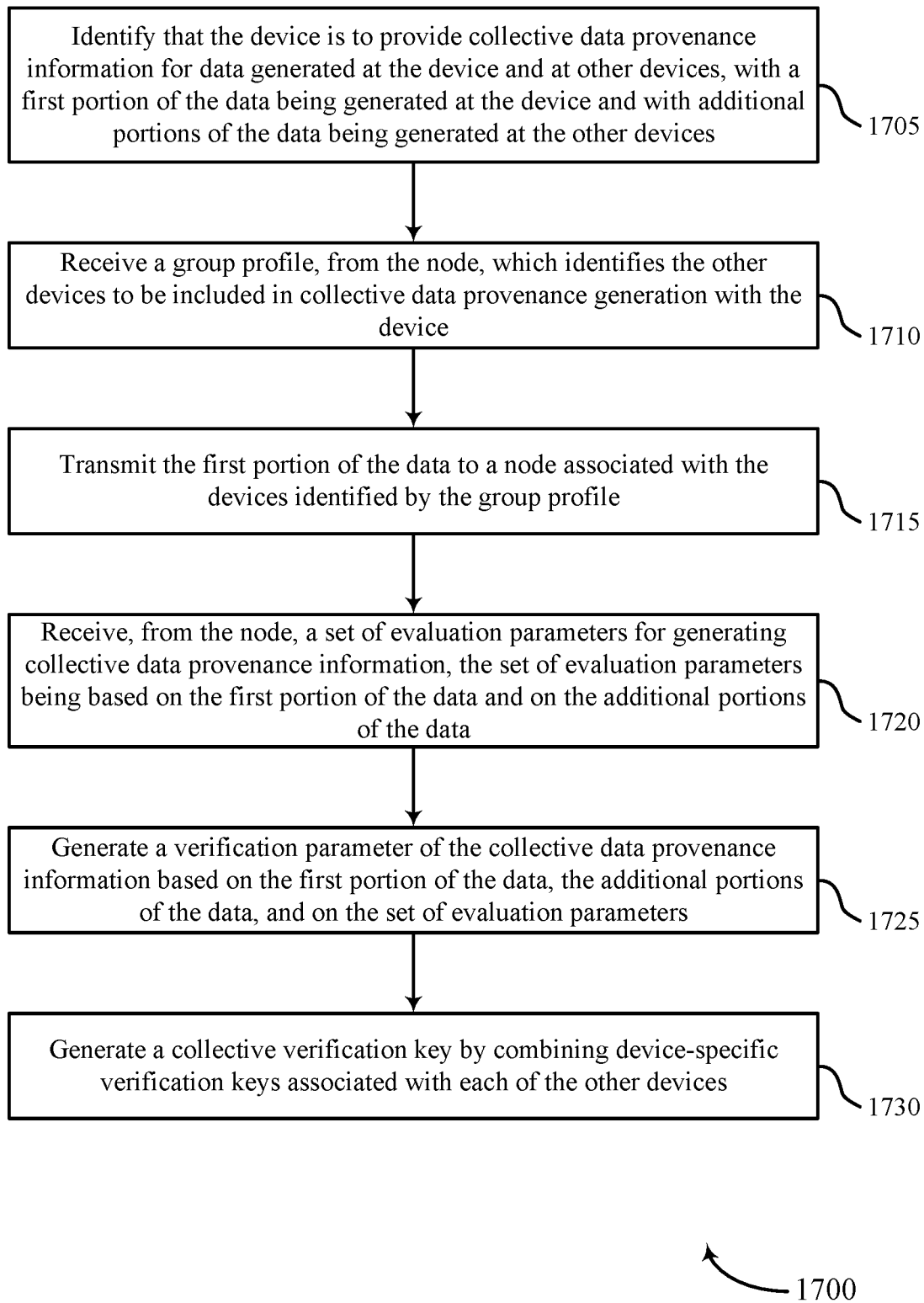
FIGS. 17 and 18 show flowcharts illustrating methods that support secure multiparty computation for Internet of Things communications in accordance with aspects of the present disclosure.

FIG. 17 shows a flowchart illustrating a method 1700 that supports efficient secure multiparty computation for Internet of Things communications in accordance with aspects of the present disclosure. The operations of method 1700 may be implemented by a device or its components as described herein. For example, the operations of method 1700 may be performed by a communications manager as described with reference to FIGS. 9 through 12. In some examples, a device may execute a set of instructions to control the functional elements of the device to perform the functions described below. Additionally or alternatively, a device may perform aspects of the functions described below using special-purpose hardware.

At 1705, the device may identify that the device is to provide collective data provenance information for data generated at the device and at other devices, with a first portion of the data being generated at the device and with additional portions of the data being generated at the other devices. The operations of 1705 may be performed according to the methods described herein. In some examples, aspects of the operations of 1705 may be performed by an identification component as described with reference to FIGS. 9 through 12.

At 1710, the device may receive a group profile, from the node, which identifies the other devices to be included in collective data provenance generation with the device. The operations of 1710 may be performed according to the methods described herein. In some examples, aspects of the operations of 1710 may be performed by a receiving component as described with reference to FIGS. 9 through 12.

At 1715, the device may transmit the first portion of the data to a node associated with the devices identified by the group profile. The operations of 1715 may be performed according to the methods described herein. In some examples, aspects of the operations of 1715 may be performed by a transmission component as described with reference to FIGS. 9 through 12.

At 1720, the device may receive, from the node, a set of evaluation parameters for generating collective data provenance information, the set of evaluation parameters being based on the first portion of the data and on the additional portions of the data. The operations of 1720 may be performed according to the methods described herein. In some examples, aspects of the operations of 1720 may be performed by a receiving component as described with reference to FIGS. 9 through 12.

At 1725, the device may generate a verification parameter of the collective data provenance information based on the first portion of the data, the additional portions of the data, and on the set of evaluation parameters. The operations of 1725 may be performed according to the methods described herein. In some examples, aspects of the operations of 1725 may be performed by a verification parameter component as described with reference to FIGS. 9 through 12.

At 1730, the device may generate a collective verification key by combining device-specific verification keys associated with each of the other devices. The operations of 1730 may be performed according to the methods described herein. In some examples, aspects of the operations of 1730 may be performed by a collective verification key component as described with reference to FIGS. 9 through 12.

Figure 18:
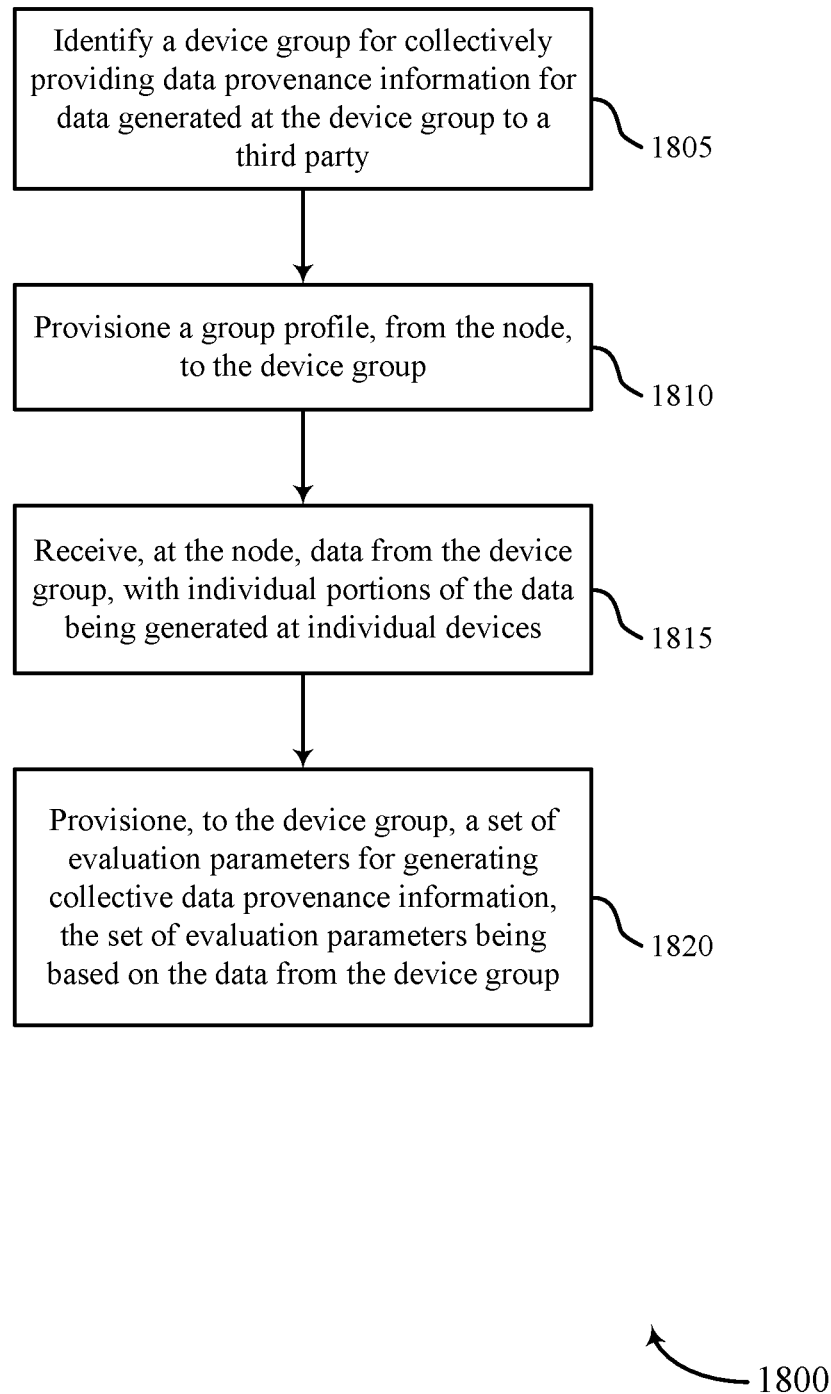

FIG. 18 shows a flowchart illustrating a method 1800 that supports efficient secure multiparty computation for Internet of Things communications in accordance with aspects of the present disclosure. The operations of method 1800 may be implemented by a node or its components as described herein. For example, the operations of method 1800 may be performed by a communications manager as described with reference to FIGS. 13 through 16. In some examples, a node may execute a set of instructions to control the functional elements of the node to perform the functions described below. Additionally or alternatively, a node may perform aspects of the functions described below using special-purpose hardware.

At 1805, the node may identify a device group for collectively providing data provenance information for data generated at the device group to a third party. The operations of 1805 may be performed according to the methods described herein. In some examples, aspects of the operations of 1805 may be performed by an identification component as described with reference to FIGS. 13 through 16.

At 1810, the node may provision a group profile, from the node, to the device group. The operations of 1810 may be performed according to the methods described herein. In some examples, aspects of the operations of 1810 may be performed by a provisioning component as described with reference to FIGS. 13 through 16.

At 1815, the node may receive, at the node, data from the device group, with individual portions of the data being generated at individual devices. The operations of 1815 may be performed according to the methods described herein. In some examples, aspects of the operations of 1815 may be performed by a receiving component as described with reference to FIGS. 13 through 16.

At 1820, the node may provision, to the device group, a set of evaluation parameters for generating collective data provenance information, the set of evaluation parameters being based on the data from the device group. The operations of 1820 may be performed according to the methods described herein. In some examples, aspects of the operations of 1820 may be performed by a provisioning component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of communication at a node, comprising:
   identifying a device group for collectively providing data provenance information for data generated at the device group to a third party;
   provisioning a group profile, from the node, to each device of the device group, the group profile comprising a function for generation, by each device of the device group, of individual portions of the data, the individual portions of the data being generated by the function based at least in part on respective data sets generated by each device of the device group;
   receiving, at the node, the data from the device group, with the individual portions of the data being generated at individual devices based at least in part on the function; and
   provisioning, to the device group, a plurality of evaluation parameters for generating collective data provenance information, the plurality of evaluation parameters being based at least in part on the data from the device group.

2. The method of claim 1, wherein provisioning the group profile further comprises:
   provisioning, to the device group, at least one of a group identity, a device index, a member list, group credentials, or a collective data function for generating the collective data provenance information of the data generated at the device group.

3. The method of claim 1, wherein provisioning the plurality of evaluation parameters further comprises:
   provisioning, to the device group, at least one of a message authentication code (MAC) share, a MAC key share, a shared random parameter, or a multiplicative triple.

4. The method of claim 1, further comprising:
   verifying an authenticity of the data collectively generated through evaluation of a message authentication code received for each device of the device group, using a group public key.

5. The method of claim 1, further comprising:
   generating at least one of a message authentication code (MAC) key and a MAC key share for provisioning to the device group.

6. The method of claim 5, further comprising:
   generating a MAC on data based at least in part on the data received from the device group.

7. The method of claim 6, further comprising:
   generating a MAC share based at least in part on creating the MAC on data for provisioning to the device group.

8. The method of claim 1, further comprising:
   generating at least one of a shared random parameter or a multiplicative triple for provisioning to the device group.

9. An apparatus at a node, comprising:
   a processor;
   memory coupled with the processor; and
   instructions stored in the memory and executable by the processor to cause the apparatus to:
     identify a device group for collectively providing data provenance information for data generated at the device group to a third party;
     provision a group profile, from the node, to each device of the device group, the group profile comprising a function for generation, by each device of the device group, of individual portions of the data, the individual portions of the data being generated by the function based at least in part on respective data sets generated by each device of the device group;
     receive, at the node, the data from the device group, with the individual portions of the data being generated at individual devices based at least in part on the function; and
     provision, to the device group, a plurality of evaluation parameters for generating collective data provenance information, the plurality of evaluation parameters being based at least in part on the data from the device group.

10. The apparatus of claim 9, wherein the instructions to provision the group profile are further executable by the processor to cause the apparatus to:
    provision, to the device group, at least one of a group identity, a device index, a member list, group credentials, or a collective data function for generating the collective data provenance information of the data generated at the device group.

11. The apparatus of claim 9, wherein the instructions to provision the plurality of evaluation parameters are further executable by the processor to cause the apparatus to:
    provision, to the device group, at least one of a message authentication code (MAC) share, a MAC key share, a shared random parameter, or a multiplicative triple.

12. The apparatus of claim 9, wherein the instructions are further executable by the processor to cause the apparatus to:
    verify an authenticity of the data collectively generated through evaluation of a message authentication code received for each device of the device group, using a group public key.

13. The apparatus of claim 9, wherein the instructions are further executable by the processor to cause the apparatus to:
    generate at least one of a message authentication code (MAC) key and a MAC key share for provisioning to the device group.

14. The apparatus of claim 13, wherein the instructions are further executable by the processor to cause the apparatus to:
    generate a MAC on data based at least in part on the data received from the device group.

15. The apparatus of claim 14, wherein the instructions are further executable by the processor to cause the apparatus to:
    generate a MAC share based at least in part on creating the MAC on data for provisioning to the device group.

16. The apparatus of claim 9, wherein the instructions are further executable by the processor to cause the apparatus to:

generate at least one of a shared random parameter or a multiplicative triple for provisioning to the device group.

17. A non-transitory computer-readable medium storing code, the code comprising instructions executable by a processor at a node to:

identify a device group for collectively providing data provenance information for data generated at the device group to a third party;

provision a group profile, from the node, to each device of the device group, the group profile comprising a function for generation, by each device of the device group, of individual portions of the data, the individual portions of the data being generated by the function based at least in part on respective data sets generated by each device of the device group;

receive, at the node, the data from the device group, with the individual portions of the data being generated at individual devices based at least in part on the function; and provision, to the device group, a plurality of evaluation parameters for generating collective data provenance information, the plurality of evaluation parameters being based at least in part on the data from the device group.

18. The non-transitory computer-readable medium of claim 17, wherein the instructions to provision the group profile are further executable by the processor to:

provision, to the device group, at least one of a group identity, a device index, a member list, group credentials, or a collective data function for generating the collective data provenance information of the data generated at the device group.

19. The non-transitory computer-readable medium of claim 17, wherein the instructions to provision the plurality of evaluation parameters are further executable by the processor to:

provision, to the device group, at least one of a message authentication code (MAC) share, a MAC key share, a shared random parameter, or a multiplicative triple.

20. The non-transitory computer-readable medium of claim 17, wherein the instructions are further executable by the processor to:

verify an authenticity of the data collectively generated through evaluation of a message authentication code received for each device of the device group, using a group public key.

\* \* \* \* \*